US010684132B2

(12) United States Patent
Johnston

(10) Patent No.: US 10,684,132 B2
(45) Date of Patent: Jun. 16, 2020

(54) GENERATION AND UPDATE OF A LANE NETWORK GRAPH MODEL

(71) Applicant: HERE Global B.V., Eindhoven (NL)

(72) Inventor: Carolyn Johnston, Lafayette, CO (US)

(73) Assignee: HERE Global B.V., Eindhoven (NL)

( * ) Notice: Subject to any disclaimer, the term of this patent is extended or adjusted under 35 U.S.C. 154(b) by 291 days.

(21) Appl. No.: 15/924,494

(22) Filed: Mar. 19, 2018

(65) Prior Publication Data

US 2019/0285421 A1   Sep. 19, 2019

(51) Int. Cl.
| | | |
|---|---|---|
| *G01C 21/00* | (2006.01) | |
| *G01C 21/32* | (2006.01) | |
| *G01C 21/34* | (2006.01) | |
| *G06F 16/29* | (2019.01) | |
| *G06F 16/23* | (2019.01) | |
| *G01C 21/26* | (2006.01) | |
| *G01C 21/30* | (2006.01) | |
| *G08G 1/0968* | (2006.01) | |
| *G08G 1/01* | (2006.01) | |

(52) U.S. Cl.
CPC ............. *G01C 21/32* (2013.01); *G01C 21/26* (2013.01); *G01C 21/30* (2013.01); *G01C 21/34* (2013.01); *G01C 21/3446* (2013.01); *G06F 16/2379* (2019.01); *G06F 16/29* (2019.01); *G08G 1/0129* (2013.01); *G08G 1/0968* (2013.01)

(58) Field of Classification Search
CPC ........ G01C 21/32; G01C 21/26; G01C 21/30; G01C 21/34; G01C 21/3446; G08G 1/0968; G08G 1/0129; G06F 16/29; G06F 16/2379
See application file for complete search history.

(56) References Cited

U.S. PATENT DOCUMENTS

2011/0099171 A1   4/2011   Van Buer
2012/0245844 A1   9/2012   Lommel et al.
(Continued)

FOREIGN PATENT DOCUMENTS

WO   WO 2017/016799 A1   2/2017

OTHER PUBLICATIONS

International Searching Authority, International Search Report and Written Opinion for International Application No. PCT/EP2019/055975, dated Jul. 24, 2019, (14 pages), European Patent Office, Rijswijk, The Netherlands.
(Continued)

*Primary Examiner* — Ian Jen
(74) *Attorney, Agent, or Firm* — Alston & Bird LLP

(57) ABSTRACT

A new drive includes a plurality of instances of location data that are received. The location data was captured by a probe apparatus onboard a vehicle as the vehicle traversed a lane network. The plurality of instances of location data are map matched using a lane level map matcher. The matched nodes (e.g., nodes of the LNG model representing the lane network to which an instance of location data was map matched) are identified and updated based on the new drive. Unmatched instances of location data (e.g., instances of location data that cannot be satisfactorily matched to a node of the LNG model) may be used to generate new nodes of the LNG model. A portion of the LNG model may be updated based on an update to a linked localization layer.

26 Claims, 5 Drawing Sheets

(56) References Cited

U.S. PATENT DOCUMENTS

| | | | | |
|---|---|---|---|---|
| 2014/0189155 A1* | 7/2014 | Morris | | H04L 61/6004 |
| | | | | 709/238 |
| 2014/0189156 A1* | 7/2014 | Morris | | H04L 45/745 |
| | | | | 709/238 |
| 2014/0244159 A1* | 8/2014 | Musabji | | G01C 21/3638 |
| | | | | 701/428 |
| 2015/0010153 A1* | 1/2015 | Robertson | | H04W 12/02 |
| | | | | 380/270 |
| 2015/0081217 A1* | 3/2015 | Renz | | G01C 21/32 |
| | | | | 701/533 |
| 2015/0219468 A1* | 8/2015 | Ziezold | | G06N 5/04 |
| | | | | 701/410 |
| 2016/0171884 A1 | 6/2016 | Chen et al. | | |
| 2016/0258764 A1 | 9/2016 | Phuyal et al. | | |
| 2016/0291125 A1* | 10/2016 | Bradley | | H04W 24/00 |
| 2016/0377439 A1 | 12/2016 | Dorum | | |
| 2017/0038219 A1* | 2/2017 | Ziezold | | G01C 21/3453 |
| 2017/0268887 A1 | 9/2017 | Jang | | |
| 2017/0314936 A1 | 11/2017 | Dorum | | |
| 2018/0182238 A1 | 6/2018 | Fowe et al. | | |

OTHER PUBLICATIONS

Dolloff, J., et al., "Fusion of Image Block Adjustments for the Generation of a Ground Control Network", Proceedings of the 10$^{th}$ International Conference on Information Fusion, Aug. 2007, 8 pages, Québec City, Canada.

Joseph, J., et al., "A Bayesian Nonparametric Approach to Modeling Mobility Patterns", Proceedings of the Twenty-Fourth AAAI Conference on Artificial Intelligence (AAAI-10), Jul. 11-15, 2010, pp. 1587-1593, Atlanta, Georgia.

U.S. Appl. No. 15/449,142, "Method and Apparatus for Updating Road Map Geometry Based on Probe Data", Unpublished (filed Mar. 3, 2017), (Ole Henry Dorum, Inventor), (Here Global B.V., assignee).

* cited by examiner

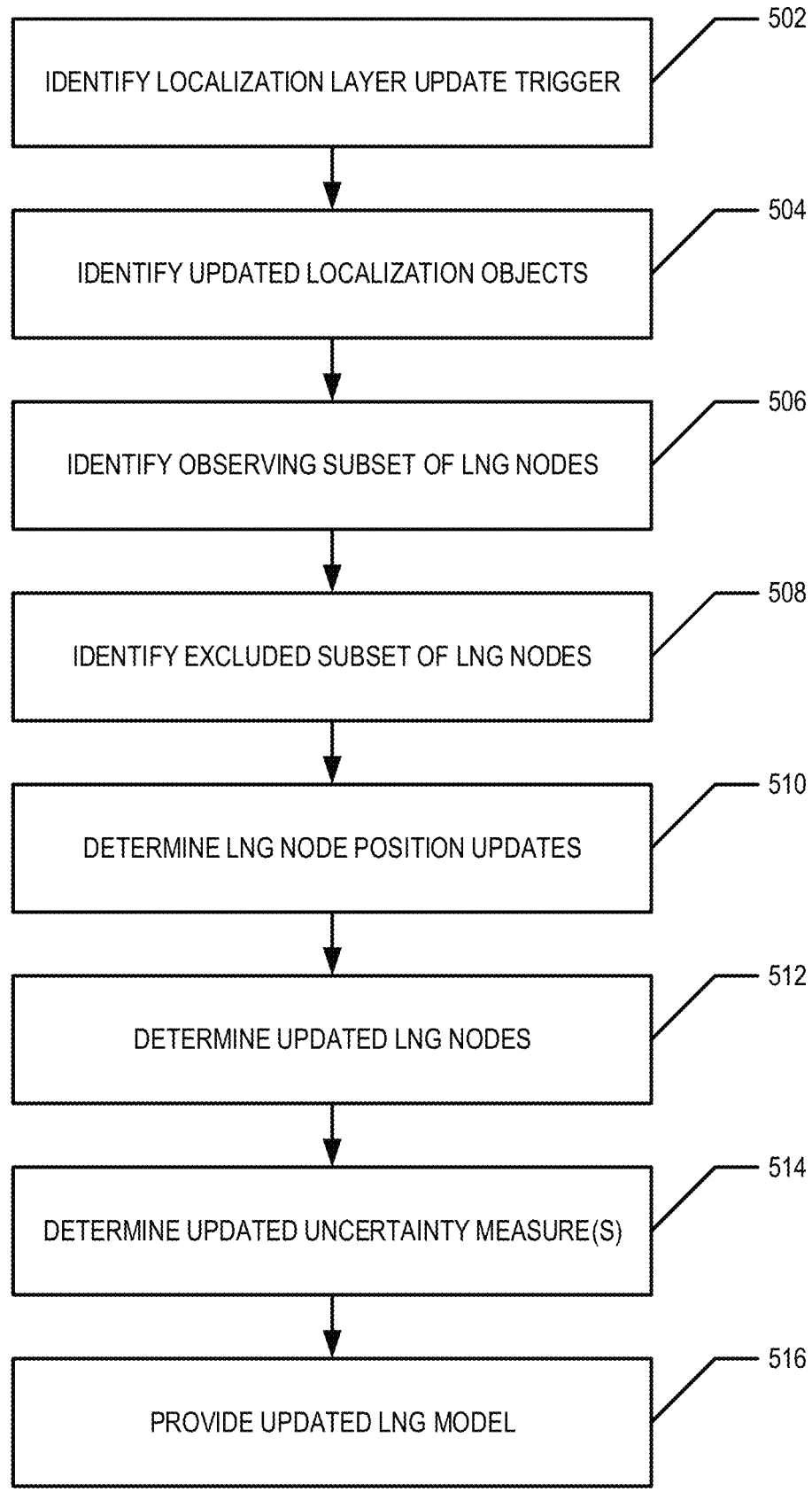

GENERATION AND UPDATE OF A LANE NETWORK GRAPH MODEL

TECHNOLOGICAL FIELD

An example embodiment relates generally to generating and updating a lane network graph model representing a navigable lane network. An example embodiment relates generally to generating and updating a lane network model based on probe data and/or updates to a localization layer of a digital map.

BACKGROUND

Emerging technologies point toward the use of self-driving autonomous vehicles and/or assisted driving of vehicles. Such vehicles require accurate maps of a road network with lane level information and accuracy. Human operators of vehicles may also benefit from navigational applications and/or tools that are able to provide lane level routing instructions and/or other lane level information.

BRIEF SUMMARY OF SOME EXAMPLE EMBODIMENTS

Various embodiments are directed to generating and updating a lane network graph (LNG) model. The LNG model represents a lane network comprising a plurality of interconnected drivable and/or traversable lanes. In various embodiments, the LNG model may be used for performing one or more navigation functions. For example, the LNG model (and/or a lane level map and/or lane level map layer derived from the LNG model) may be used for determining a route through at least a portion of the lane network, providing instructions and/or information/data regarding a route through the lane network and/or about a portion of a lane network, and providing navigation information/data required for an autonomous vehicle or an advanced driver assistance system (ADAS) to navigate at least a portion of the lane network, and/or the like. For example, an autonomous vehicle or an ADAS may use the LNG model and/or a lane level map and/or a lane level map layer derived from the LNG model to perform lane keeping, functions, lane change functions, to maintain a vehicle within a lane, and/or the like.

In various embodiments, the LNG model is generated and/or updated based on new drives, each new drive comprising a time-ordered sequence of instances of location information/data provided by a probe apparatus. In various embodiments, a plurality of probe apparatuses may provide new drives. For example, a probe apparatus may be onboard a vehicle traversing at least a portion of the lane network. The probe apparatus may capture probe information/data corresponding to a new drive through at least a portion of the lane network, wherein the probe information/data comprises a plurality of instances of location information/data. An instance of location information/data may comprise a position (e.g., a geolocation such as a latitude, longitude, and/or elevation or altitude) and/or heading (e.g., direction in which the probe apparatus and/or vehicle is pointing and/or traveling) of the vehicle and/or probe apparatus at the time the instance of location information/data was captured.

The time-ordered sequences of pluralities of instances of location information/data may be map matched using a lane level map matcher such that instances of location information/data may be matched to corresponding nodes of the LNG model. In various embodiments, a node of the LNG model may comprise a node position, a node heading, and a node interconnectivity measure. In various embodiments, the LNG model may be updated based on the instances of location information/data that are matched to nodes of the LNG model. For example, a Bayesian update technique may be used to update one or more nodes of an LNG model based on instances of location information/data. In an example embodiment, the map matcher may identify one or more instances of location information/data that cannot be matched to a node of the LNG model and that may represent a new drivable and/or traversable lane of the lane network that is not yet represented in the LNG model. In various embodiments, such unmatched instances of location information/data may be used to add new nodes to the LNG model representing the new drivable and/or traversable lane of the lane network.

In an example embodiment, an LNG model may be linked to and/or associated with a localization layer of a digital map. For example, a node of the LNG model may comprise observation information/data identifying one or more localization objects of the localization layer that have been observed from the node, a number of times a localization object has been observed from the node, an observed distance between the node and the localization object, and/or the like. For example, an instance of location information/data may include a localization object identifier and/or information/data identifying a localization object, a measured and/or observed distance between the vehicle and/or apparatus at the time the instance of location information/data was captured, and/or the like. When a node of the LNG model is updated based on the instance of location information/data the information/data corresponding to any observed localization objects may also be updated. In various embodiments, when a localization layer update trigger is identified, the LNG model may be updated based on one or more updates to the localization layer.

In an example embodiment, an LNG model may be updated based on a new drive. A new drive is received. The new drive comprises a plurality of instances of location data. Each instance of location data (a) is captured by a probe apparatus onboard a vehicle traversing at least a portion of a traversable lane network and (b) comprises a position and a heading corresponding to the vehicle when the instance of location data was captured. The probe apparatus comprises at least one location sensor. The plurality of instances of location data are map matched based on an LNG model. The LNG model comprises (a) a plurality of nodes corresponding to locations of traversable lanes of the lane network and (b) one or more uncertainty measures corresponding to the plurality of nodes. A first node of the plurality of nodes comprises (i) a node position and (ii) a node heading. One or more matched nodes of the plurality of nodes are identified. Each matched node has one or more instances of location data map matched thereto. A first node is identified as matching a first instance of location data based on (a) at least one of (i) the position or (ii) the heading of an instance of location data and (b) at least one of (i) a first node position or (ii) a first node heading of the first node. At least one of a position update, a heading update, or an uncertainty measure update is determined based on the plurality of instances of location data. At least one of the node position, node heading, or uncertainty measure is updated based on the corresponding at least one of the position update, the heading update, or the uncertainty measure update to generate an updated LNG model by executing at least a portion of the computer program code by the processor.

In accordance with an example embodiment, a method is provided. In an example embodiment, the method comprises receiving a new drive by a model apparatus. The model apparatus comprises a processor, memory storing computer program code, and a communication interface configured to communicate via at least one network. The new drive comprises a plurality of instances of location data. Each instance of location data (a) is captured by a probe apparatus onboard a vehicle traversing at least a portion of a traversable lane network and (b) comprises a position and a heading corresponding to the vehicle when the instance of location data was captured. The probe apparatus comprises at least one location sensor. The method further comprises map matching the plurality of instances of location data based on a lane network graph (LNG) model by executing at least a portion of the computer program code by the processor. The LNG model comprises (a) a plurality of nodes corresponding to locations of traversable lanes of the lane network and (b) one or more uncertainty measures corresponding to the plurality of nodes. A first node of the plurality of nodes comprises (i) a node position and (ii) a node heading. The method further comprises identifying one or more matched nodes from the plurality of nodes by executing at least a portion of the computer program code by the processor. Each matched node has one or more instances of location data map matched thereto. A first node is identified as matching a first instance of location data based on (a) at least one of (i) the position or (ii) the heading of an instance of location data and (b) at least one of (i) a first node position or (ii) a first node heading of the first node. The method further comprises determining at least one of a position update, a heading update, or an uncertainty measure update based on the plurality of instances of location data by executing at least a portion of the computer program code by the processor; and updating at least one of the node position, node heading, or uncertainty measure based on the corresponding at least one of the position update, the heading update, or the uncertainty measure update to generate an updated LNG model by executing at least a portion of the computer program code by the processor.

In an example embodiment, the method further comprises preparing a map tile comprising a lane level map layer derived based at least in part on the updated LNG model by executing at least a portion of the computer program code by the processor; and providing the map tile to a computing entity via the communication interface, wherein the computing entity is configured to perform one or more navigation functions based on the updated map tile. In an example embodiment, the computing entity is an advanced driving assistance system and the one or more navigation functions are used in the autonomous or assisted driving of a vehicle corresponding to the computing entity.

In an example embodiment, the uncertainty measure encodes at least one of (a) uncertainty in the first node position or (b) uncertainty in the first node heading. In an example embodiment, the uncertainty measure encodes at least one of (a) uncertainty in the first node position due to uncertainty in a second node position or a second node heading of a second node or (b) uncertainty in the first node heading due to uncertainty in the second node position or the second node heading of the second node, wherein the second node is different from the first node. In an example embodiment, the method further comprises fitting a curve to the plurality of instances of location data; and generating a plurality of interpolated instances of location data based on the curve, wherein map matching the plurality of instances of location data comprising map matching the plurality of interpolated instances of location data. In an example embodiment, one or more instances of location data of the plurality of instances of location data are unmatched as a result of the map matching and the method further comprises generating one or more new nodes based on the unmatched instances of location data.

In an example embodiment, the first node further comprises one or more instances of observation data, each instance of observation data identifying a localization object of a localization layer. In an example embodiment, the method further comprises identifying a localization layer update trigger; responsive to identifying the localization update trigger, identifying one or more localization objects that have been updated; identifying a set of observing nodes, the set of observing nodes consisting of nodes comprising observation data identifying at least one of the one or more localization objects that have been updated; determining at least one of a localization layer position update, a localization layer heading update, or a localization layer uncertainty measure update for each node of a set of update nodes based on the one or more localization objects that have been updated, wherein the set of update nodes comprises the set of observing nodes and one or more nodes not in the set of observing nodes; and determining at least one of an updated node position, updated node heading, or updated uncertainty measure based on the corresponding at least one of the localization layer position update, localization layer heading update, or localization layer uncertainty measure update for each node of the set of update nodes. In an example embodiment, determining the at least one of the localization layer position update, the localization layer heading update, or the localization layer uncertainty measure update is a low-rank matrix operation. In an example embodiment, a plurality of nodes of the LNG model are not in the set of update nodes and the plurality of nodes of the LNG model that are not in the set of update nodes are not updated.

In accordance with an example embodiment, an apparatus is provided. In an example embodiment, the apparatus comprises at least one processor, a communications interface configured for communicating via at least one network, and at least one memory storing computer program code. The at least one memory and the computer program code are configured to, with the processor, cause the apparatus to at least receive a new drive. The new drive comprises a plurality of instances of location data. Each instance of location data (a) is captured by a probe apparatus onboard a vehicle traversing at least a portion of a traversable lane network and (b) comprises a position and a heading corresponding to the vehicle when the instance of location data was captured. The probe apparatus comprises at least one location sensor. The at least one memory and the computer program code are configured to, with the processor, cause the apparatus to at least map match the plurality of instances of location data based on a lane network graph (LNG) model by executing at least a portion of the computer program code by the processor. The LNG model comprises (a) a plurality of nodes corresponding to locations of traversable lanes of the lane network and (b) one or more uncertainty measures corresponding to the plurality of nodes. A first node of the plurality of nodes comprises (i) a node position and (ii) a node heading. The at least one memory and the computer program code are further configured to, with the processor, cause the apparatus to at least identify one or more matched nodes from the plurality of nodes by executing at least a portion of the computer program code by the processor. Each matched node has one or more instances of location data map matched thereto. A first node is identified as matching a first instance of location data based on (a) at least one of (i) the position or (ii) the heading of an instance of location data and (b) at least one of (i) a first node position or (ii) a first node heading of the first node. The at least one memory and the computer program code are further configured to, with the processor, cause the apparatus to at least determine at least one of a position update, a heading update, or an uncertainty measure update based on the plurality of instances of location data; and update at least one of the node position, node heading, or uncertainty measure based on the corresponding at least one of the position update, the heading update, or the uncertainty measure update to generate an updated LNG model.

In an example embodiment, the at least one memory and the computer program code are further configured to, with the processor, cause the apparatus to at least prepare a map tile comprising a lane level map layer derived based at least in part on at least a portion of the updated LNG model by executing at least a portion of the computer program code by the processor; and provide the map tile to a computing entity via the communication interface, wherein the computing entity is configured to perform one or more navigation functions based on the updated map tile. In an example embodiment, the computing entity is an advanced driving assistance system and the one or more navigation functions are used in the autonomous or assisted driving of a vehicle corresponding to the computing entity.

In an example embodiment, the uncertainty measure encodes at least one of (a) uncertainty in the first node position or (b) uncertainty in the first node heading. In an example embodiment, the uncertainty measure encodes at least one of (a) uncertainty in the first node position due to uncertainty in a second node position or a second node heading of a second node or (b) uncertainty in the first node heading due to uncertainty in the second node position or the second node heading of the second node, wherein the second node is different from the first node. In an example embodiment, the at least one memory and the computer program code are further configured to, with the processor, cause the apparatus to at least fit a curve to the plurality of instances of location data; and generate a plurality of interpolated instances of location data based on the curve, wherein map matching the plurality of instances of location data comprises map matching the plurality of interpolated instances of location data. In an example embodiment, one or more instances of location data of the plurality of instances of location data are unmatched as a result of the map matching and the at least one memory and the computer program code are further configured to, with the processor, cause the apparatus to at least generate one or more new nodes based on the unmatched instances of location data.

In an example embodiment, the first node further comprises one or more instances of observation data, each instance of observation data identifying a localization object of a localization layer. In an example embodiment, the at least one memory and the computer program code are further configured to, with the processor, cause the apparatus to at least identify a localization layer update trigger; responsive to identifying the localization update trigger, identify one or more localization objects that have been updated; identify a set of observing nodes, the set of observing nodes consisting of nodes comprising observation data identifying at least one of the one or more localization objects that have been updated; determine at least one of a localization layer position update, a localization layer heading update, or a localization layer uncertainty measure update for each node of a set of update nodes based on the one or more localization objects that have been updated, wherein the set of update nodes comprises the set of observing nodes and one or more nodes not in the set of observing nodes; and determine at least one of an updated node position, updated node heading, or updated uncertainty measure based on the corresponding at least one of the localization layer position update, localization layer heading update, or localization layer uncertainty measure update for each node of the set of update nodes. In an example embodiment, determining the at least one of the localization layer position update, the localization layer heading update, or the localization layer uncertainty measure update is a low-rank matrix operation. In an example embodiment, a plurality of nodes of the LNG model are not in the set of update nodes and the plurality of nodes of the LNG model that are not in the set of update nodes are not updated.

In accordance with an example embodiment, a computer program product is provided that comprises at least one non-transitory computer-readable storage medium having computer-executable program code instructions stored therein. The computer-executable program code instructions comprise program code instructions that are configured, when executed by a processor of an apparatus, to cause the apparatus to receive a new drive. The new drive comprises a plurality of instances of location data. Each instance of location data (a) is captured by a probe apparatus onboard a vehicle traversing at least a portion of a traversable lane network and (b) comprises a position and a heading corresponding to the vehicle when the instance of location data was captured. The probe apparatus comprises at least one location sensor. The computer-executable program code instructions comprise program code instructions that are further configured, when executed by a processor of an apparatus, to cause the apparatus to map match the plurality of instances of location data based on a lane network graph (LNG) model by executing at least a portion of the computer program code by the processor. The LNG model comprises (a) a plurality of nodes corresponding to locations of traversable lanes of the lane network and (b) one or more uncertainty measures corresponding to the plurality of nodes. A first node of the plurality of nodes comprises (i) a node position and (ii) a node heading. The computer-executable program code instructions comprise program code instructions that are further configured, when executed by a processor of an apparatus, to cause the apparatus to identify one or more matched nodes from the plurality of nodes by executing at least a portion of the computer program code by the processor. Each matched node has one or more instances of location data map matched thereto. A first node is identified as matching a first instance of location data based on (a) at least one of (i) the position or (ii) the heading of an instance of location data and (b) at least one of (i) a first node position or (ii) a first node heading of the first node. The computer-executable program code instructions comprise program code instructions that are further configured, when executed by a processor of an apparatus, to cause the apparatus to determine at least one of a position update, a heading update, or an uncertainty measure update based on the plurality of instances of location data; and update at least one of the node position, node heading, or uncertainty measure based on the corresponding at least one of the position update, the heading update, or the uncertainty measure update to generate an updated LNG model.

In an example embodiment, the computer-executable program code instructions comprise program code instructions that are further configured, when executed by a processor of an apparatus, to cause the apparatus to prepare a map tile comprising a lane level map layer derived based at least in part on at least a portion of the updated LNG model by executing at least a portion of the computer program code by the processor; and provide the map tile to a computing entity via the communication interface, wherein the computing entity is configured to perform one or more navigation functions based on the updated map tile. In an example embodiment, the computing entity is an advanced driving assistance system and the one or more navigation functions are used in the autonomous or assisted driving of a vehicle corresponding to the computing entity.

In an example embodiment, the uncertainty measure encodes at least one of (a) uncertainty in the first node position or (b) uncertainty in the first node heading. In an example embodiment, the uncertainty measure encodes at least one of (a) uncertainty in the first node position due to uncertainty in a second node position or a second node heading of a second node or (b) uncertainty in the first node heading due to uncertainty in the second node position or the second node heading of the second node, wherein the second node is different from the first node. In an example embodiment, the computer-executable program code instructions comprise program code instructions that are further configured, when executed by a processor of an apparatus, to cause the apparatus to fit a curve to the plurality of instances of location data; and generate a plurality of interpolated instances of location data based on the curve, wherein map matching the plurality of instances of location data comprises map matching the plurality of interpolated instances of location data. In an example embodiment, one or more instances of location data of the plurality of instances of location data are unmatched as a result of the map matching and the computer-executable program code instructions comprise program code instructions that are further configured, when executed by a processor of an apparatus, to cause the apparatus to generate one or more new nodes based on the unmatched instances of location data.

In an example embodiment, the first node further comprises one or more instances of observation data, each instance of observation data identifying a localization object of a localization layer. In an example embodiment, the computer-executable program code instructions comprise program code instructions that are further configured, when executed by a processor of an apparatus, to cause the apparatus to identify a localization layer update trigger; responsive to identifying the localization update trigger, identify one or more localization objects that have been updated; identify a set of observing nodes, the set of observing nodes consisting of nodes comprising observation data identifying at least one of the one or more localization objects that have been updated; determine at least one of a localization layer position update, a localization layer heading update, or a localization layer uncertainty measure update for each node of a set of update nodes based on the one or more localization objects that have been updated, wherein the set of update nodes comprises the set of observing nodes and one or more nodes not in the set of observing nodes; and determine at least one of an updated node position, updated node heading, or updated uncertainty measure based on the corresponding at least one of the localization layer position update, localization layer heading update, or localization layer uncertainty measure update for each node of the set of update nodes. In an example embodiment, determining the at least one of the localization layer position update, the localization layer heading update, or the localization layer uncertainty measure update is a low-rank matrix operation. In an example embodiment, a plurality of nodes of the LNG model are not in the set of update nodes and the plurality of nodes of the LNG model that are not in the set of update nodes are not updated.

In accordance with yet another example embodiment of the present invention, an apparatus is provided that comprises means for receiving a new drive by a model apparatus. The new drive comprises a plurality of instances of location data. Each instance of location data (a) is captured by a probe apparatus onboard a vehicle traversing at least a portion of a traversable lane network and (b) comprises a position and a heading corresponding to the vehicle when the instance of location data was captured. The probe apparatus comprises at least one location sensor. The apparatus further comprises means for map matching the plurality of instances of location data based on a lane network graph (LNG) model. The LNG model comprises (a) a plurality of nodes corresponding to locations of traversable lanes of the lane network and (b) one or more uncertainty measures corresponding to the plurality of nodes. A first node of the plurality of nodes comprises (i) a node position and (ii) a node heading. The apparatus further comprises means for identifying one or more matched nodes from the plurality of nodes. Each matched node has one or more instances of location data map matched thereto. A first node is identified as matching a first instance of location data based on (a) at least one of (i) the position or (ii) the heading of an instance of location data and (b) at least one of (i) a first node position or (ii) a first node heading of the first node. The apparatus further comprises means for determining at least one of a position update, a heading update, or an uncertainty measure update based on the plurality of instances of location data. The apparatus further comprises means for updating at least one of the node position, node heading, or uncertainty measure based on the corresponding at least one of the position update, the heading update, or the uncertainty measure update to generate an updated LNG model.

BRIEF DESCRIPTION OF THE DRAWINGS

Figure 1:
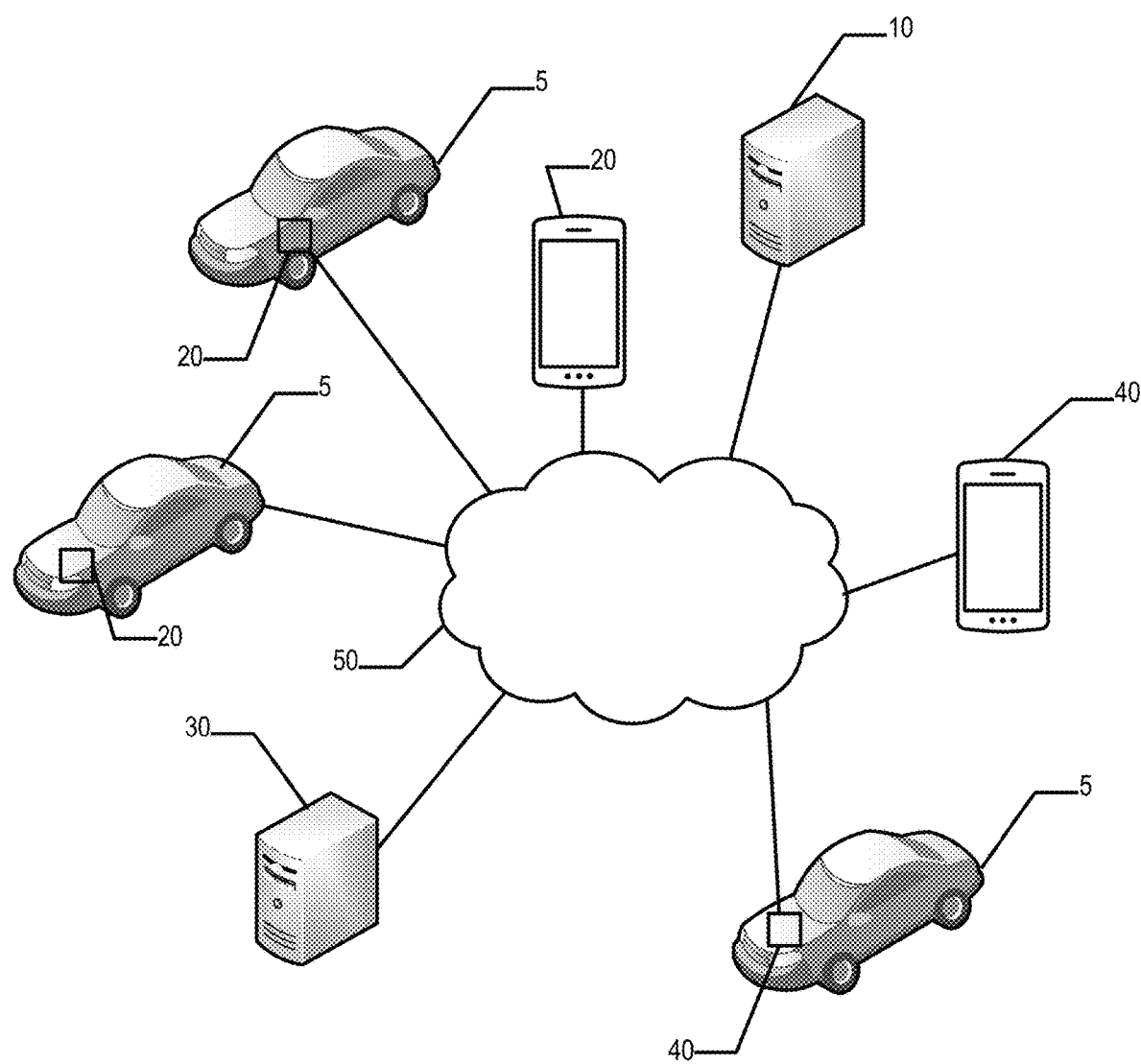
Figure 2A:
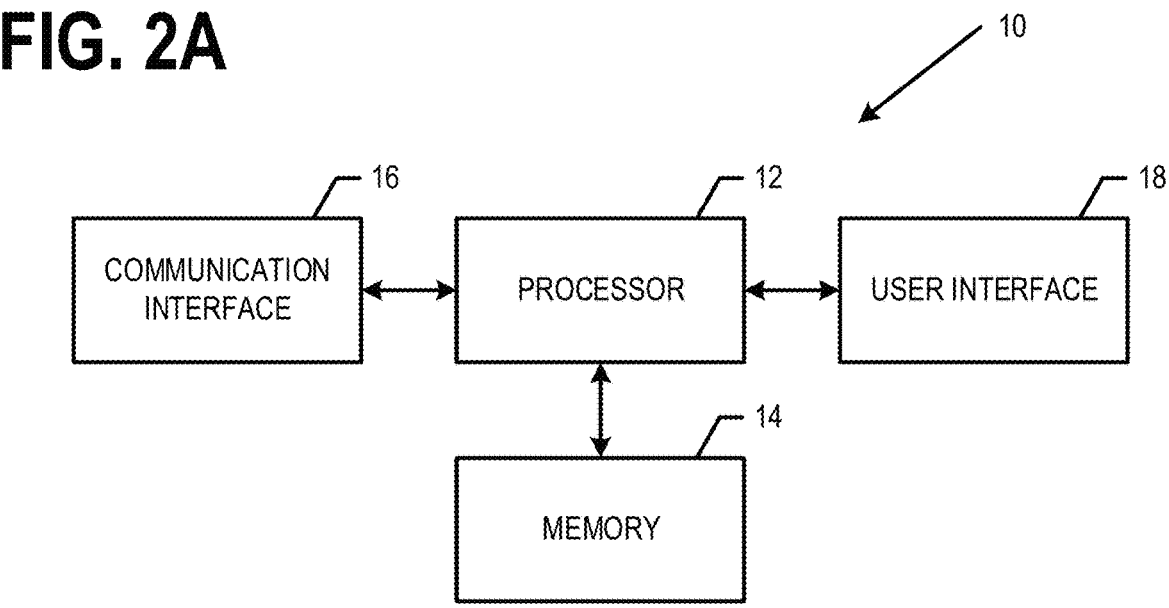
Figure 2B:
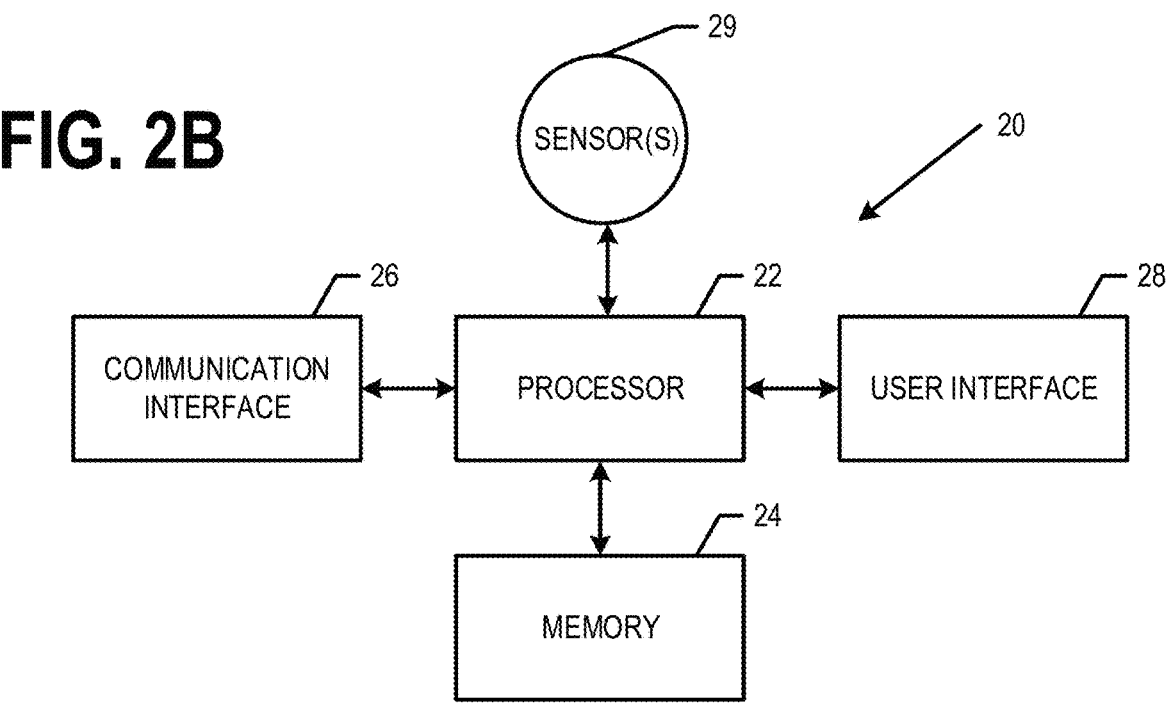
Figure 3:
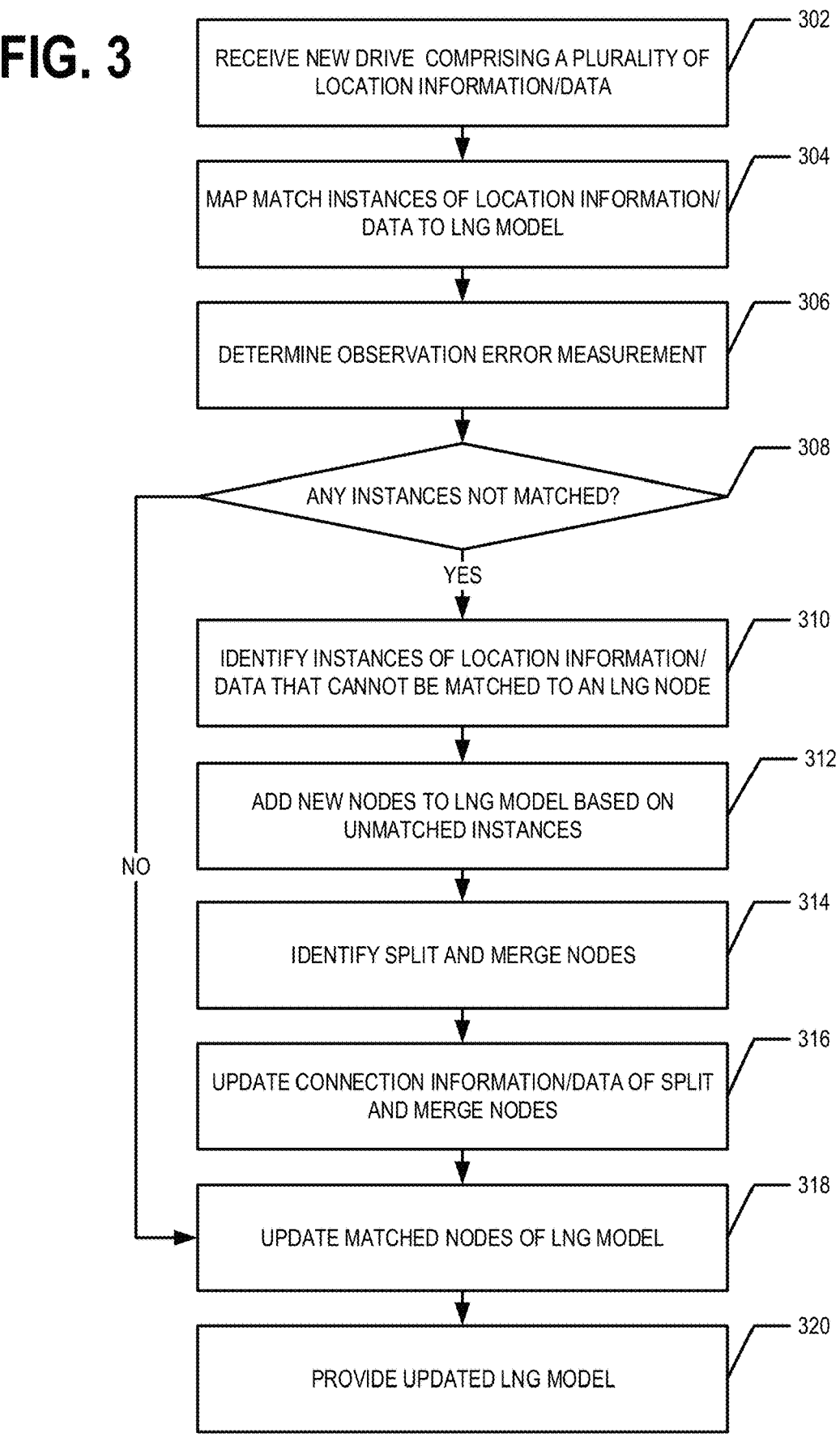
Figure 4:
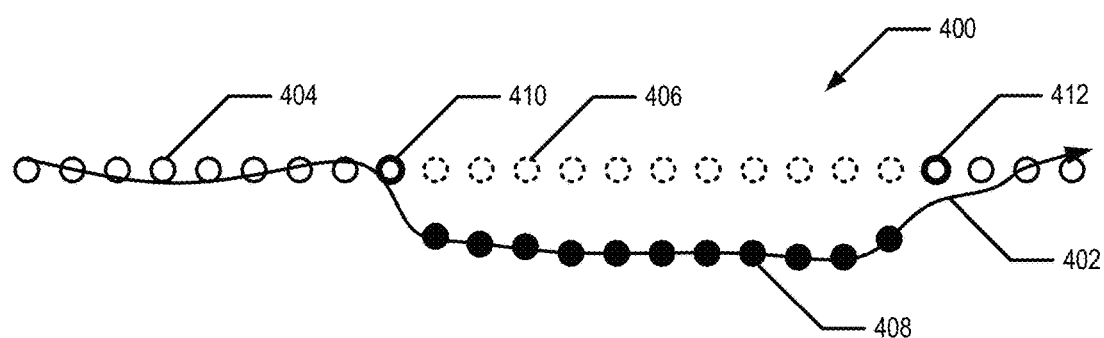
Figure 6:
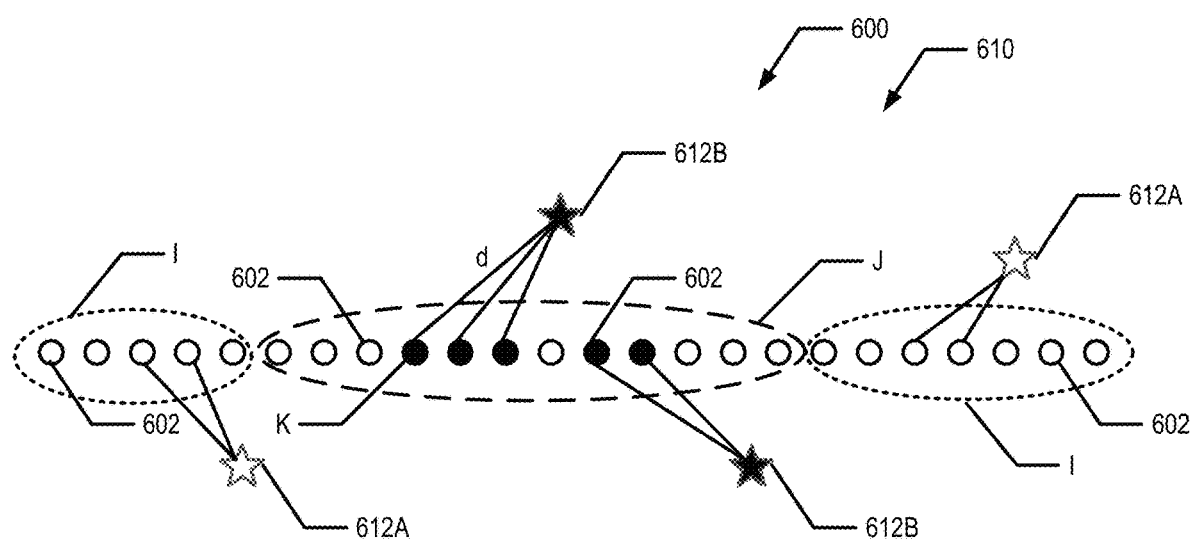

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a model apparatus that may be specifically configured in accordance with an example embodiment;

FIG. 2B is a block diagram of a probe apparatus that may be specifically configured in accordance with an example embodiment;

FIG. 3 is a flowchart illustrating operations performed, such as by the model apparatus of FIG. 2A to update an LNG model, in accordance with an example embodiment;

FIG. 4 is a schematic diagram illustrating probe information/data that has been lane level map matched to nodes of the LNG model, in accordance with an example embodiment;

FIG. 5 is a flowchart illustrating operations performed, such as by the model apparatus of FIG. 2A to update an LNG model based on an update to a linked localization layer of a digital map, in accordance with an example embodiment; and FIG. 6 is a schematic diagram illustrating a first and second set of nodes of the LNG model, in accordance with an example embodiment.

DETAILED DESCRIPTION OF SOME EXAMPLE EMBODIMENTS

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. The term "or" (also denoted "/") is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware.

I. General Overview

Methods, apparatus and computer program products are provided in accordance with an example embodiment in order to generate and update an LNG model. The LNG model represents a lane network comprising a plurality of interconnected drivable and/or traversable lanes. In various embodiments, the LNG model comprises a plurality of nodes and describes the geometry and connectivity of a plurality of drives, drivable paths, and/or the like. In various embodiments, the LNG model may be used to perform one or more navigation functions such as, for example, determining a route from an origin to a destination, providing information/data regarding an area of a digital map and/or lane network, providing lane level route guidance for a human operator or an autonomous vehicle, performing one or more autonomous and/or ADAS functions (e.g., lane keeping, lane change assistance, maintaining a lane), and/or the like.

In various embodiments, a model apparatus may receive one or more new drives from one or more probe apparatus. In an example embodiment, a new drive comprises a time sequence of a plurality of instances of location information/data that are captured as a probe apparatus (e.g., onboard a vehicle) traverses at least a portion of the lane network. Each instance of location information/data comprises a position and a heading corresponding to the position and heading of the probe apparatus and/or vehicle when the instance of location data was captured. In an example embodiment, an instance of location information/data comprises one or more error measures indicating the uncertainty in one or more elements and/or components of the position and/or heading of the instance of location information/data. The instances of location information/data may then be matched to nodes of the LNG model using a map matcher. In an example embodiment, the map matcher is a lane level map matcher that matches an instance of location information/data to a particular lane of the LNG model. In various embodiments, the map matcher may identify instances of location information/data that cannot be satisfactorily matched to a node of the LNG model. In various embodiments, new nodes may be added to the LNG model based on instances of location information/data that cannot be matched to an existing node of the LNG model. In the various embodiments, the instances of location information/data that are map matched to an existing node of the LNG model may be used to update one or more existing nodes of the LNG model. For example, a node of the LNG model may comprise a node position and a node heading that represent a distribution of positions and headings from one or more instances of location information/data that have been map matched to that node.

In various embodiments, the LNG model may comprise one or more uncertainty measures. For example, in various embodiments, a node of the LNG model may further comprise one or more node error measures. In an example embodiment, a node error measure may describe any uncertainty in the node position and/or node heading. For example, the node error measure may be a covariance matrix, and/or the like. In various embodiments, an LNG model may comprise one or more node connectivity measures that describes the connection between a pair of nodes. In an example embodiment, a node connectivity measure may describe the uncertainty in a first node position and/or first node heading of a first node due to uncertainty in a second node position and/or second node heading of a second node. For example, the node connectivity measure may be a cross-covariance matrix corresponding to a first node and a second node. In an example embodiment, the LNG model comprises node connectivity measures of each pair of nodes in the LNG model. The node connectivity measure may indicate that nodes that are physically close to each other (e.g., immediately adjacent or have only a few intervening nodes between them) are more connected and/or more affected by uncertainty in the other node's node position and/or node heading. For example, if a first node is located physically near a second node and the first node is located physically distant (e.g., separated by a kilometer or a mile or more) from a third node, the node connectivity measure may indicate a stronger relationship between the first node and the second node than between the first node and the third node. In an example embodiment, the LNG model may comprise one uncertainty measure that encodes the node error measure(s) of each node and the node connectivity measures for each pair of nodes. For example, the uncertainty measure may comprise an |L|·|z| by |L|·|z| error-connectivity matrix, wherein |L| is the number of nodes in the LNG model and |z| is the dimensionality of a node position and node heading (e.g., the number of elements/components in a vector $$z = \begin{bmatrix} \vec{pos} \\ \vec{head} \end{bmatrix},$$

where $\vec{pos}$ is the node position and $\vec{head}$ is the node heading). In an example embodiment, the error-connectivity matrix is an error covariance matrix.

In various embodiments, an LNG model may be linked to a localization layer of a digital map. In an example embodiment, a localization layer is a layer of a digital map comprising a plurality of localization objects, wherein localization objects correspond to observable objects that may be used by a probe apparatus 20 for performing one or more localization functions. Some non-limiting examples of possible localization objects are road signs, street lamps and/or lamp posts, building facades, lane lines, and/or the like. For example, an instance of location information/data may further comprise information/data identifying a localization object that was observed from the position and/or heading of the instance of location information/data. In an example embodiment, the instance of location information/data may indicate a distance measured between the probe apparatus and/or vehicle and the identified localization object. When the instance of location information/data is map matched to a node of the LNG model, the node may be updated to include an identifier for the localization object, the measured distance, and/or the like. In an example embodiment, the localization layer may be updated (e.g., the location of a stop sign may be updated to reflect a more precise and/or accurate location of the stop sign) causing a localization layer update trigger to be received, observed, identified, and/or the like. Responsive to receiving, observing, identifying, and/or the like the localization layer update trigger, a first set of nodes may be identified that consists of nodes from which updated localization objects have been observed. Based on the update(s) to the localization layer, the first set of nodes, and the node connectivity measure(s), a second set of nodes is updated. In an example embodiment, the second set of nodes may comprise at least a portion of the first set of nodes and other nodes that were not in the first set of nodes.

In various embodiments, the LNG model and/or a portion thereof may be provided as a layer of a digital map and/or map tile. The digital map and/or map tile may be provided to one or more mobile apparatuses, servers, and/or other apparatuses for use in performing one or more navigation functions. In various embodiments, the one or more navigation functions may comprise route planning, route guidance, lane level route planning and/or guidance, travel time and/or distance determinations and/or estimations, and/or the like.

FIG. 1 provides an illustration of an example system that can be used in conjunction with various embodiments of the present invention. As shown in FIG. 1, the system may include one or more model apparatuses 10, a plurality of probe apparatuses 20, wherein each probe apparatus 20 is disposed on a vehicle 5, one or more map matching engines 30, one or more other computing entities 40, one or more networks 50, and/or the like. In various embodiments, the probe apparatus 20 may be an in vehicle navigation system, vehicle control system, a mobile computing device, and/or the like. For example, a probe apparatus 20 may be an in vehicle navigation system mounted within and/or be onboard a vehicle 5 such as a motor vehicle, non-motor vehicle, automobile, car, scooter, truck, van, bus, motorcycle, bicycle, Segway, golf cart, and/or the like. In an example embodiment, the probe apparatus 20 may be a vehicle control system configured to autonomously drive a vehicle 5, assist in control of a vehicle 5, monitor various aspects of the vehicle 5 (e.g., fault conditions, motor oil status, battery charge level, fuel tank fill level, and/or the like) and/or the like. In various embodiments, probe apparatus 20 configured to autonomously drive a vehicle 5 may perform multiple functions that are similar to those performed by a probe apparatus configured to be an ADAS (e.g., lane keeping, lane change assistance, maintaining a lane, merging, etc.). In some embodiments, a probe apparatus 20 may be onboard a personal vehicle, commercial vehicle, public transportation vehicle, fleet vehicle, and/or other vehicle. In various embodiments, the probe apparatus 20 may be a smartphone, tablet, personal digital assistant (PDA), personal computer, desktop computer, laptop, and/or other mobile computing device. In an example embodiment, the model apparatus 10 may be a server, group of servers, distributed computing system, and/or other computing system. For example, the model apparatus 10 may be in communication with a plurality of probe apparatuses 20, one or more map matching engines 30, one or more other computing entities 40, and/or the like via one or more wired or wireless networks 50.

In an example embodiment, a model apparatus 10 may comprise components similar to those shown in the example model apparatus 10 diagrammed in FIG. 2A. In an example embodiment, the model apparatus 10 is configured to receive a plurality of new drives each comprising a plurality of instances of location information/data from a plurality of probe apparatuses 20; update the LNG model based on the received new drives; update the LNG model responsive to a localization layer update trigger; and/or the like. For example, as shown in FIG. 2A, the model apparatus 10 may comprise a processor 12, memory 14, a user interface 18, a communications interface 16, and/or other components configured to perform various operations, procedures, functions or the like described herein. In at least some example embodiments, the memory 14 is non-transitory.

In an example embodiment, a probe apparatus 20 is onboard a vehicle 5. In an example embodiment, the probe apparatus 20 may be configured to provide navigation and/or route information/data to a user (e.g., an operator of the vehicle 5). In an example embodiment, the probe apparatus 20 may be configured to autonomously drive a vehicle 5 and/or assist in control of a vehicle 5 (e.g., an ADAS) in accordance with navigation and/or route information. In an example embodiment, the probe apparatus 20 may be configured to gather, collect, capture, and/or the like instances of location information/data as the vehicle 5 moves through the lane network and/or a portion thereof. For example, an instance of location information/data may comprise a time stamp indicating the time that the instance of location information/data was gathered, collected, captured and/or the like. In an example, an instance of location information/data may comprise a position and/or heading corresponding to a location and/or heading of the vehicle 5 at the time the instance of location information/data was gathered, collected, captured, and/or the like. In an example embodiment, an instance of location information/data may comprise information/data identifying one or more localization objects observed when the probe apparatus 20 and/or vehicle 5 was located at the position and/or heading of the instance of location information/data, a distance between the probe apparatus 20 and/or vehicle 5 and at least one of the one or more localization objects when the probe apparatus 20 and/or vehicle 5 was located at the position and/or heading of the instance of location information/data, and/or the like.

In an example embodiment, as shown in FIG. 2B, the probe apparatus 20 may comprise a processor 22, memory 24, a communications interface 26, a user interface 28, one or more sensors 29 (e.g., a location sensor such as a GNSS sensor; IMU sensors; camera(s); two dimensional (2D) and/or three dimensional (3D) light detection and ranging (LiDAR)(s); long, medium, and/or short range radio detection and ranging (RADAR); ultrasonic sensors; electromagnetic sensors; (near-) infrared (IR) cameras; 3D cameras; 360° cameras; fuel level sensors; vehicle system sensors (e.g., oil status sensors, tire pressure sensors, engine oil pressure sensors, coolant level sensors, engine/coolant temperature sensors, and/or other sensors that enable the probe apparatus 20 to determine one or more features of the corresponding vehicle's 5 surroundings and/or monitor the vehicle's 5 operating parameters), and/or other components configured to perform various operations, procedures, functions or the like described herein. In at least some example embodiments, the memory 24 is non-transitory.

In an example embodiment, the model apparatus 10 may be in communication with a plurality of probe apparatuses 20 and, optionally, one or more map matching engines 30 and/or one or more other computing entities 40. For example, the model apparatus 10 may be in communication with a map matching engine 30 configured to perform one or more map matching functions, perform one or more updates of the localization layer, and/or the like. In an example embodiment, the model apparatus 10 may perform one or more map matching functions, update the localization layer, and/or the like. In various embodiments, the model apparatus 10 may be in communication with one or more other computing entities 40. In an example embodiment, a computing entity 40 may be a mobile device (e.g., smart phone, navigation device, tablet, laptop, etc.), a desktop computer, server, or other computing entity. In an example embodiment, a computing entity 40 may be a probe apparatus 20. In an example embodiment, a map matching engine 30 and/or computing entity 40 may comprise similar elements to the model apparatus 10 and/or the probe apparatus 20. For example, the map matching engine 30 and/or computing entity 40 may comprise a processor, memory, a user interface, a communications interface, and/or the like. In an example embodiment, the computing entity 40 may comprise one or more sensors similar to sensor(s) 29.

Each of the components of the system may be in electronic communication with, for example, one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/high definition (HD) radio or other digital radio system, and/or the like. For example, a probe apparatus 20 may be in communication with a model apparatus 10 via the network 50. For example, a probe apparatus 20 may communicate with the model apparatus 10 via a network, such as the Cloud. For example, the Cloud may be a computer network that provides shared computer processing resources and data to computers and other devices connected thereto. For example, the probe apparatus 20 may be configured to receive one or more map tiles of a digital map from the model apparatus 10 or another map service connected via the network 50, traffic information/data (embedded in a map tile of a digital map and/or separate therefrom), and/or provide new drives (e.g., comprising a time sequence of a plurality of instances of location information/data) to the model apparatus 10.

Certain example embodiments of the probe apparatus 20 and the model apparatus 10 are described in more detail below with respect to FIGS. 2A and 2B.

II. Example Operation

Example embodiments provide methods, apparatus, systems, computer program products, and/or the like for generating and updating a LNG model. For example, a probe apparatus 20 (e.g., onboard a vehicle 5) traversing at least a portion of a lane network may capture instances of location information/data periodically, regularly, and/or the like and provide (e.g., transmit) the instances of location information/data. The model apparatus 10 may receive the instances of location information/data and use the instances of location information/data to update and/or generate an LNG model. In an example embodiment, an LNG model may be linked and/or associated with a localization layer. In such embodiments, the LNG model may be updated, for example, by the model apparatus 10, responsive to a localization layer update trigger corresponding to the update of one or more localization objects of the localization layer. In various embodiments, the model apparatus 10 may provide the LNG model and/or a portion thereof as a layer of a digital map and/or map tile. For example, in an example embodiment, a lane level map and/or a layer thereof may be generated, derived, and/or determined based on the LNG model and at least a portion of the lane level map and/or layer thereof may be provided to another computing entity 40. For example, the lane level map and/or lane level map layer may comprise curves, polylines, and/or the like representing travel lanes of the lane network and that are determined based on and/or derived from the LNG model. For example another computing entity 40 may use the LNG model and/or lane level map and/or map layer based on the LNG model to perform one or more navigation functions.

In an example embodiment, an LNG model represents a lane network comprising a network of traversable lanes. In various embodiments, an LNG model comprises a plurality of nodes, connection information/data, node connectivity measures, frequency information/data tracking the frequency of observation and/or map matching of drives to the nodes of the LNG, and/or the like. In an example embodiment, a node is a data set comprising a node identifier, a node position, and a node heading. In an example embodiment, the node identifier is configured to uniquely identify the node of the plurality of nodes. In an example embodiment, the node position is a location (e.g., geolocation; latitude and longitude; latitude, longitude and elevation/altitude; and/or the like). In an example embodiment, the node heading indicates a direction corresponding to the node (e.g., an angle in a plane that is locally defined at the node position; roll, pitch, and yaw; and/or the like). In an example embodiment, the node position and node heading describe (e.g., are the average of) a distribution of positions and headings provided by the plurality of probe vehicles 20 (e.g., as part of the instances of location information/data).

In an example embodiment, a node comprises a node error measure. In various embodiments, a node error measure may describe the uncertainty in the node position and node heading due to noise and/or errors in the instances of location information/data and/or curve fittings to instances of location information/data used to determine the node position and/or node heading. In an example embodiment, the node error measure is a covariance of the node position and node heading. For example, a node N may be $$N\left(\begin{bmatrix}\vec{pos}\\\vec{head}\end{bmatrix},\begin{pmatrix}C(\vec{pos},\vec{pos})&C(\vec{pos},\vec{head})\\C(\vec{head},\vec{pos})&C(\vec{head},\vec{head})\end{pmatrix}\right)=$$

$$N\left(\begin{bmatrix}\vec{pos}\\\vec{head}\end{bmatrix},\text{Covar}\left(\begin{bmatrix}\vec{pos}\\\vec{head}\end{bmatrix},\begin{bmatrix}\vec{pos}\\\vec{head}\end{bmatrix}\right)\right),$$

wherein $\vec{pos}$ is the 3-dimensional node position, $\vec{head}$ is the 3-dimensional node heading, C refers to the individual 3-dimensional covariance or cross-covariance matrices between $\vec{pos}$ and $\vec{head}$, and Covar is the full 6-dimensional covariance matrix for the stacked vector $$\begin{bmatrix}\vec{pos}\\\vec{head}\end{bmatrix}.$$

In an example embodiment, the full covariance matrix Covar is a six by six matrix. In an example embodiment, the node position may be two dimensional (e.g., latitude and longitude) and/or the node heading may be one dimensional (e.g., number of degrees from a reference direction). As should be understood, the dimensions of the full covariance matrix are determined based on the combined dimensionality of the node position and node heading.

In an example embodiment in which the LNG model is linked and/or associated with a localization layer, a node may further comprise a list of localization objects observed from the node position, one or more distance measurements between the node and the localization object, a number of times a particular localization object has been observed from the node position, and/or the like. For example, an instance of location information/data may comprise a localization object identifier and a measurement of the distance between the vehicle 5 and the localization object when the vehicle 5 was at the position of the location information/data. The localization object identifier and the distance measurement may be added to the node to which the instance of location information/data was matched. In an example embodiment, a number of times a localization object has been identified in instances of location information/data matched to a node may also be stored in the data set of the node.

In various embodiments, the LNG model further comprises connection information/data. In various embodiments, the connection information/data may indicate the connection between nodes of the LNG model and/or lanes of the lane network. For example, the connection information/data may indicate where a vehicle 5 may legally pass from one lane to another lane. For example, the connection information/data may indicate lane merge and split points, lane entrances and exits, where a vehicle may change from one lane to an adjacent lane, and/or the like. In an example embodiment, the connection information/data comprises links that indicate how a probe apparatus 20 and/or vehicle 5 may move between the nodes. For example, a vehicle 5 may travel along the links between the nodes but may not directly travel from a first node to a second node if the first node and the second node are not connected by a link. In various embodiments, the links may be directional.

In various embodiments, the LNG model further comprises node connectivity measures. For example, the LNG model comprises node connectivity measures that describe the connectivity between pairs of nodes. In an example embodiment, the node connectivity measure may describe any uncertainty in a first node position or first node heading of a first node based on uncertainty in a second node position or second node heading of a second node. For example, the LNG model may comprise a node connectivity measure for each pair of nodes in the LNG model. In an example embodiment, the node connectivity measure corresponding to a first node and a second node that are directly adjacent and/or close to one another may indicate a greater connection between the first node and the second node than a node connectivity measure corresponding to the first node and a third node that are separated by a kilometer, a mile, or more. In an example embodiment, the node connectivity measure is a cross-covariance. For example, the node connectivity measure corresponding to a first node $$N_1=\begin{bmatrix}\vec{pos_1}\\\vec{head_1}\end{bmatrix}$$

and a second $$N_2=\begin{bmatrix}\vec{pos_2}\\\vec{head_2}\end{bmatrix}\text{ is Cross-covar }(N_1,N_2)=$$

$$\text{Cross-covar}\left(\begin{bmatrix}\vec{pos_1}\\\vec{head_1}\end{bmatrix},\begin{bmatrix}\vec{pos_2}\\\vec{head_2}\end{bmatrix}\right)=$$

$$\begin{pmatrix}C(\vec{pos_1},\vec{pos_2})&C(\vec{pos_1},\vec{head_2})\\C(\vec{head_1},\vec{pos_2})&C(\vec{head_1},\vec{head_2})\end{pmatrix},$$

wherein $\vec{pos_1}$ is the node position of the first node, $\vec{pos_2}$ is the node position of the second node, $\vec{head_1}$ is the node heading of the first node, $\vec{head_2}$ is the node heading of the second node, C is the ****** operator, and Cross-covar is the cross-covariance operator that determines a cross-covariance matrix of the two input vectors. In an example embodiment, the cross-covariance matrix is a six by six matrix.

In various embodiments, the LNG model may be represented, described, and/or the like, at least in part, as a set of nodes L=N(μ, Σ), wherein μ is the set of node positions and node headings $$\begin{bmatrix}\vec{pos}\\\vec{head}\end{bmatrix}$$

and Σ is the corresponding sets of node error measures and/or node connectivity measures. In an example embodiment, the node error measures for a plurality of nodes may be represented as a single matrix. In an example embodiment, the node error measures and the node connectivity measures for a plurality of nodes may be represented as a single error-connectivity matrix Q. For example, in an example embodiment, the uncertainty measure(s) for the LNG model (e.g., the set of node error measures and/or node connectivity measures Σ) may be encoded in and/or comprise an error-connectivity matrix Q.

Generating and Updating an LNG Model Based on a New Drive

FIG. 3 provides a flowchart illustrating example processes, procedures, and operations that are performed in an example embodiment to generate and/or update an LNG model based on a new drive. As noted above, a new drive comprises a plurality and/or sequence of instances of location information/data. For example, a new drive may comprise a time-ordered sequence of a plurality of instances of location information/data.

Starting at block 302, a new drive is received. For example a probe apparatus 20 traversing at least a portion of a lane network (e.g., onboard a vehicle 5, carried by a pedestrian, and/or the like). The probe apparatus 20 may capture, generate, and/or the like instances of location information/data regularly, periodically, responsive to a capture trigger, and/or the like. In an example embodiment, an instance of location information/data may comprise a probe apparatus and/or vehicle identifier. In an example embodiment, an instance of location information/data comprises a position and/or a heading. In an example embodiment, an instance of location information/data may comprise one or more error measures. For example, an instance of location information/data may comprise an error covariance matrix that describes the uncertainty in one or more elements and/or components of the position and/or heading (e.g., due to errors and/or uncertainty in the measurements used to determine the position and/or heading, such as uncertainty in a GPS reading, and/or the like) and the effect of the uncertainty in a first element and/or component on a second element and/or component. For example, the instance of location information/data comprises a position and heading provided as latitude, longitude, elevation, pitch, roll and yaw, and the error covariance matrix may comprise the uncertainty in the latitude measurement/determination and the affect and/or uncertainty of the latitude measurement/determination due to the uncertainty in the pitch measurement/determination.

In an example embodiment, an instance of location information/data comprises a localization object identifier corresponding to a localization object viewed from the position of the instance of location information/data, a distance measurement between the localization object and the position of the instance of location information/data, and/or the like. In an example embodiment, an instance of location information/data may comprise a probe apparatus identifier configured to identify the probe apparatus 20 that captured, generated, and/or the like the instance of location information/data, a time stamp indicating the time when the instance of location information/data was captured, and/or the like. In an example embodiment, the position is the geolocation (e.g., latitude and longitude or latitude, longitude, and elevation/altitude) of the probe apparatus 20 at the time the instance of location information/data was captured. For example, the probe apparatus 20 may comprise a location sensor 29 (e.g., GNSS sensor, IMU sensor(s), and/or the like) for determining the position of the probe apparatus 20. In an example embodiment, the heading indicates a direction of travel of the probe apparatus 20 and/or vehicle 5, a direction the probe apparatus 20 and/or vehicle 5 is pointing, and/or the like. In various embodiments, the heading may be an angle in a plane that is locally defined by the ground surface at the position of the instance of location information/data; a roll, pitch, and/or yaw of the probe apparatus 20 and/or vehicle 5, and/or the like. In various embodiments, the probe apparatus 20 may comprise one or more sensors configured to observe localization objects (e.g., signs, lamp posts, lane lines, buildings, and/or other generally static/non-moving objects) in the vicinity of the probe apparatus 20 and/or vehicle 5, and/or measure the distance between the probe apparatus 20 and/or vehicle 5 from the observed localization object, and/or the like.

The probe apparatus 20 may thus capture a time sequence of a plurality of instances of location information/data. The probe apparatus 20 may then provide (e.g., transmit) at least a portion of the time sequence of the plurality of instances of location information/data. For example, the processor 22 may cause the communications interface 26 to provide and/or transmit at least a portion of the time sequence of the plurality of instances of location information/data via one or more networks 50. In various embodiments, the model apparatus 10 may receive the time sequence of a plurality of instances of location information/data. For example, the model apparatus may comprise means, such as the processor 12, communications interface 16, memory 14, and/or the like for receiving the time sequence of the plurality of instances of location information/data.

In an example embodiment, the model apparatus 10 may fit a curve (e.g., a smoothing spline or other curve) to the time sequence of the plurality of instances of location information/data and/or a portion thereof. In various embodiments, the fitting of the smoothing spline or other curve to a plurality of instances of location information/data may be performed before or after the map matching step described with respect to block 304. In an example embodiment, the fitting of the smoothing spline and/or other curve reduces the noise inherent in the instances of location information/data. In an example embodiment, the direction of travel of the probe apparatus 20 and/or vehicle 5 when the time sequence of the plurality of instances of location information/data was captured is taken into account when fitting the smoothing spline and/or other curve to the time sequence. In various embodiments, after the smoothing spline or other curve is fit to a plurality of instances of location information/data, the smoothing spline and/or other curve may be resampled to generate a near uniform distribution of estimated and/or interpolated instances of location information/data. As should be understood references to instances of location information/data may be instances of location information/data as provided by a probe apparatus 20 or estimated and/or interpolated instances of location information/data determined and/or generated based on the time sequence of a plurality of instances of location information/data comprising a new drive.

In various embodiments, the new drive may be represented by the vector $\vec{n}$, wherein the vector $\vec{n}$ comprises a time-ordered sequence of a plurality of instances of location information/data or estimated and/or interpolated instances of location information/data.

Responsive to receiving the new drive and/or time sequence of the plurality of instances of location information/data and/or to identifying a new drive processing trigger, the new drive may be map matched, at block 304. For example, the model apparatus 10 may map match one or more instances of location information/data of the time sequence of a plurality of instances of location information/data. For example, the model apparatus 10 may comprise means, such as processor 12, memory 14, and/or the like for map matching one or more instances of location information/data. In an example embodiment, the model apparatus 10 may communicate with a map matching engine 30 to cause the map matching of the instances of location information/data. In various embodiments, the instances of location information/data may be matched to existing nodes of the LNG model. In various embodiments, the instances of location information/data may be map matched using a lane level map matcher. In various embodiments, the instances of location information/data may be map matched by a lane level map matcher that is configured and/or programmed to identify situations in which an instance of location information/data cannot be satisfactorily map matched to an existing node of an LNG model. For example, the map matcher may use a hidden Markov model that includes a state that corresponds to a lane that is not represented by the existing nodes of the LNG model. For example, in an example embodiment, the instances of location information/data may be map matched via a method similar to that described in U.S. application Ser. No. 15/389,500 with the modification of adding a state that does not correspond to an existing lane, node, or set of nodes of the LNG model. For example, the map matching method of U.S. application Ser. No. 15/389,500 may be modified to include a "no matching lane" and unmatched state.

In an example embodiment, an instance of location information/data may be map matched to a node of the LNG model based on the position of the instance of location information/data. For example, if the node having a node position that is closest (e.g., based on Euclidean distance or another distance measure) to the position of the instance of location information/data satisfies a distance threshold requirement, the instance of location information/data may be matched to that node. If the node having a node position that is closest (e.g., based on Euclidean distance or another distance measure) to the position of the instance of location information/data does not satisfy the distance threshold requirement, the instance of location information/data may be marked as being not matchable to an existing node of the LNG model. In another example, the map matching of the instances of location information/data may be based on minimizing a global measure of the goodness of fit of a plurality of instances of location information/data to a corresponding plurality of nodes. In various embodiments, a variety of map matching techniques may be used to match instances of location information/data to nodes of the LNG model and to identify nodes that cannot be satisfactorily matched to an existing node.

FIG. 4 provides a schematic diagram illustrating a new drive 402 comprising a time ordered sequence of a plurality of instances of location information/data and a plurality of nodes 406 of a portion of an LNG model 400. The matched instances of location information/data 404 are matched to existing nodes 406 of the LNG model (e.g., matched nodes) and are shown as open circles with solid lines. The unmatched instances of location information/data 408 do not match and/or correspond to existing nodes of the LNG model and are shown as filled circles. The open circles with dashed lines are nodes 406 that do not correspond to an instance of location information/data of the new drive 402. In an example embodiment, the existing nodes of the LNG model are termed group 1a nodes, nodes of the LNG model that are generated and/or added to the LNG model as part of the update (e.g., based on unmatched instances of location information/data) are termed group 1b nodes, and existing nodes of the LNG model that are not matched to an instance of location information/data of the new drive are termed group 2 nodes. For example, matched nodes are existing nodes of the LNG model to which one or more matched instances of location information/data have been map matched. Unmatched instances of location information/data were not satisfactorily map matched to an existing node. Unmatched nodes are existing nodes of the LNG model to which no instances of location information/data of the new drive were map matched. In an example embodiment in which the new drive is represented by the vector $\vec{n}$, the vector $\vec{n}$ may comprise a set of matched instances of location information/data $n_{1a}$ and a set of unmatched instances of location information/data $n_{1b}$, such that $\vec{n}=(n_{1a}, n_{1b})$. In turn, for example, $n_{1a}$ itself consists of a stacked set of position and heading vectors ($\vec{pos}, \vec{head}$), one for each node in the group 1a set of nodes. Similarly, $n_{1b}$ consists of a stacked set of position and heading vectors ($\vec{pos}, \vec{head}$) corresponding to the nodes in the group 1b set of nodes.

Continuing with FIG. 3, at block 306, an observation error measure $\Gamma$ for the new drive is determined. For example, the model apparatus 10 may determine, calculate, and/or the like an observation error measure for the new drive. For example, the model apparatus 10 may comprise means, such as the processor 12, memory 14, and/or the like for determining, calculating, and/or the like an observation error measure for the new drive. In an example embodiment, an observation error measure may be determined based on the error measure of one or more instances of location information/data of the new drive. In an example embodiment, the observation error measure $\Gamma$ for the new drive is determined based on the error measure (e.g., cross-covariances) of the instances of location information/data of the new drive, one or more spline basis matrices corresponding to fitting a spline or other curve to the plurality of instances of location information/data to generate a time-ordered sequence of estimated and/or interpolated instances of location information/data, and/or the like. In an example embodiment, observation error measure $\Gamma$ for a new drive $\vec{n}=(n_{1a}, n_{1b})$ is of the form $$\Gamma = \begin{bmatrix} \Gamma_{1a,1a} & \Gamma_{1a,1b} \\ \Gamma_{1b,1a} & \Gamma_{1b,1b} \end{bmatrix},$$

wherein $\Gamma_{1a,1a}$ is the error covariance matrix for the stacked drive vector $n_{1a}$, $\Gamma_{1b,1b}$ is the error covariance matrix for the stacked drive vector $n_{1b}$, and $\Gamma_{1a,1a}=\Gamma^t_{1b,1a}$ is an error cross-covariance matrix between the stacked drive vectors $n_{1a}$ and $n_{1b}$. In an example embodiment, the determination and/or calculation of the observation error measure may be determined before, after, and/or concurrently with blocks 308, 310, 312, 314, or 316.

At block 308, it is determined if there are any instances of location information/data of the new drive that were not matched to an existing node of the LNG model. For example, it may be determined if all of the instances of location information/data of the new drive were map matched to existing nodes of the LNG model. For example, the model apparatus 10 may determine if there are any instances of location information/data of the new drive that were not matched to an existing node of the LNG model. For example, the model apparatus 10 may comprise means, such as the processor 12, memory 14, and/or the like, for determining if there are any instances of location information/data of the new drive that were not matched to an existing node of the LNG model. For example, it may be determined if there are any instances of location information/data of the new drive that were map matched to the "no matching lane" and/or unmatched state, and/or the like. If it is determined, at block 308, that all of the instances of location information/data of the new drive were map matched to existing nodes of the LNG model, then the process continues to block 318. If it is determined, at block 308, that not all of the instances of location information/data of the new drive were map matched to existing nodes of the LNG model, then the process continues to block 310.

At block 310, the instances of location information/data that were not map matched to an existing node of the LNG model are identified. For example, the model apparatus 10 may identify the one or more instances of location information/data of the new drive that were not map matched to an existing node of the LNG model. For example, the model apparatus 10 may comprise means, such as the processor 12, memory 14, and/or the like, for identifying one or more instances of location information/data that were not map matched to an existing node of the LNG model. For example, any instances of location information/data that were map matched to a "no matching lane" or unmatched state and/or for which a corresponding existing node of the LNG model was not determined may be identified. For example, the unmatched instances of location information/data 408 may be identified. For example, the map matcher may return a list or series of instances of location information/data and corresponding existing nodes 406 of the LNG model. Any instance of location information/data 404 for which a corresponding existing node 406 is not provided. In another example, the map matcher may return a state corresponding to instances of location information/data that may indicate a corresponding node. If an instance of location information/data is returned with a state corresponding to "no matched lane" or unmatched state, that instance of location information/data may be identified as not being matched to an existing node of the LNG model. In various embodiments, node connectivity measures may be generated for the new node(s) such that each pair of nodes of the LNG model corresponds to a node connectivity measure of the LNG model. In an example embodiment, it may be apriori assumed that a new node is independent of any existing nodes and/or any other node in the LNG model. For example, in an example embodiment, the node connectivity measures assigned to a new node may be apriori assigned such that the node position and/or node heading of the new node is not affected by uncertainty in the node position and/or node heading of the existing nodes and/or any other node of the LNG (e.g., including any other new nodes) model.

At block 312, new nodes are added to the LNG model. For example, the position and heading of one or more and/or each instance of location information/data that was identified as not being matched to an existing node of the LNG model may be used to generate new nodes of the LNG model. For example, a new node may be generated comprising the position and heading of the corresponding unmatched instance of location information/data and an assigned node error measure. In various embodiments, the assigned node error measure may be determined based on the node error measure of neighboring and/or nearby existing nodes in the LNG model. In an example embodiment, the node error measure may be determined based on the error measure of the corresponding instance of location information/data. In an example embodiment, a spline or other curve may be fit to the new drive (e.g., the time sequence of instances of location information/data that comprise the new drive). In such an embodiment, the node error measure may be generated based on fitting of the spline or other curve to the new drive. For example, in an example embodiment, a smoothing spline may be fit to the time sequence of the plurality of instances of location information/data and the resulting spline may be resampled to generate a set of approximately uniform spacing. In an example embodiment, the node error measure is a conjugate matrix of the spline basis matrix of the coefficient covariance matrix calculated from the autocovariances of the instances of location information/data during the spline fitting. In an example embodiment, a new node is assigned an apriori, predetermined, and/or predefined node error measure. In an example embodiment, if the unmatched instance of location information/data included any localization object identifiers and/or corresponding distance measurements, the localization object identifiers and/or corresponding distance measurements may also be stored to the new node. For example, the model apparatus 10 may generate a new node of the LNG model based on an instance of location information/data that was identified as not being matched to an existing node of the LNG model. For example, the model apparatus 10 may comprise means, such as the processor 12, memory 14, and/or the like, for generating a new node of the LNG model based on an instance of location information/data that was identified as not being matched to an existing node of the LNG model.

At block 314, split and merge nodes may be identified. For example, the model apparatus 10 may identify one or more split and/or merge nodes based on the existing nodes 406 and the new nodes generated based on the unmatched instances of location information/data 408. For example, the model apparatus 10 may comprise means, such as the processor 12, memory 14, and/or the like, for identifying one or more split and/or merge nodes based on the existing nodes 406 and the new nodes generated based on the unmatched instances of location information/data 408. For example, a split node 410 may be a node corresponding to a location in a lane network where two lanes split and/or a vehicle 5 may pass or first pass from a first lane to a second, adjacent lane. For example, the lane network may comprise a climbing lane and a split node 410 may be located at the beginning of the climbing lane. For example a merge node 412 may be a node corresponding to a location in a lane network where two lanes merge and/or a vehicle 5 may pass or last pass from the second lane to the adjacent first lane. For example, the merge node 412 may be located at the end of the climbing lane. For example, the connection information/data of the LNG model comprises one in-link and one out-link for a through node, more than one in-link for a merge node, and more than one out-link for a split node.

At block 316, the connection information/data is updated based on the identified merge node 412 and split node 410. For example, the model apparatus 10 may update the connection information/data based on the identified merge node 412, split node 410, and/or new nodes. For example, the model apparatus 10 may comprise means, such as a processor 12, memory 14, and/or the like, for updating the connection information/data based on the identified merge node 412, split node 410, and/or new nodes. For example, the connection information/data may be updated to indicate how a vehicle 5 may access the portion of the lane network represented by the new nodes and/or pass between the portion of the lane network represented by the existing nodes 406 and the portion of the lane network represented by the new nodes.

At block 318, one or more nodes of the LNG model may be updated based on the matched instances of location information/data 404 and the corresponding existing nodes 406. For example, the model apparatus 10 may update and/or modify one or more nodes of the LNG model based on the matched instances of location information/data 404 and the corresponding existing nodes 406. For example, the model apparatus 10 may comprise means, such as processor 12, memory 14, and/or the like, for updating and/or modifying one or more nodes of the LNG model based on the matched instances of location information/data 404 and the corresponding existing nodes 406. In an example embodiment, only the nodes 406 corresponding to a matched instance of location information/data 404 are updated and/or modified as part of the update. In various embodiments, the node position, node heading, node error measure(s), and/or node connectivity measures corresponding to a node 406 may be updated. In an example embodiment, the nodes 406 corresponding to a matched instance of location information/data 404 and one or more nodes that do not correspond to a matched instance of location information/data 404 may be updated and/or modified as part of the update. For example, an existing node 406 that does not correspond to a matched instance of location information/data 404 (e.g., a node that did not have an instance of location information/data matched thereto), may be updated based on one or more node connectivity measures corresponding to the node. In an example embodiment, the new nodes are added to the LNG model prior to the updating of the existing nodes of the LNG model such that the new nodes may be updated, modified, adjusted, and/or the like in the update of the LNG model.

In various embodiments, one or more nodes of the LNG model may be updated based on the new drive using a Bayesian update technique. For example, if the LNG model and/or set of nodes achieved after blocks 312, 314, and/or 316 is termed the prior LNG model and/or set of nodes $L_0 = N(\mu_0, \Sigma_0)$, where $\mu_0$ is the set of node positions and node headings $$\begin{bmatrix} \overrightarrow{pos} \\ \overrightarrow{head} \end{bmatrix}$$

and $\Sigma_0$ is one or more uncertainty measures (e.g., an error-connectivity matrix $Q_0$, and/or the like) describing the node error measures and node connectivity measures corresponding to the nodes of the set of nodes $L_0$. For example, the error-connectivity matrix $Q_0$ may have the form $Q_0 =$ $$\begin{bmatrix} Q_{0,1a,1a} & Q_{0,1a,2} & 0 \\ Q_{0,2,1a} & Q_{0,2,2} & 0 \\ 0 & 0 & Q_{0,1b,1b} \end{bmatrix},$$

wherein $Q_{0,1a,1a}$ is an error-connectivity sub-matrix or block corresponding to and/or comprising error and node connectivity measures for the group 1a nodes (e.g., the existing nodes of the LNG model to which instances of location information/data of the new drive were map matched), $Q_{0,2,2}$ is a error-connectivity sub-matrix or block corresponding to and/or comprising error and node connectivity measures for the group 2 nodes (e.g., the existing nodes of the LNG model to which instances of location information/data of the new drive were not map matched), $Q_{0,1a,2}$ and $Q_{0,2,1a}$ are error-connectivity sub-matrices or blocks corresponding to and/or comprising the node connectivity measures corresponding to pairs of nodes wherein a first node of the pair of nodes is a group 1a node and a second node of the pair of nodes is a group 2 node, and $Q_{0,1b,1b}$ is an error-connectivity sub-matrix or block corresponding to and/or comprising error and node connectivity measures for the group 1b nodes. As described above with respect to block 312, the 0's in the above form of $Q_0$ are sub-matrices or blocks consisting of 0's due to the apriori assumption that the uncertainty in the new nodes is not connected to the uncertainty in the existing nodes of the LNG model. In an example embodiment, the sub-matrix $Q_{0,1b,1b}$ may be a multiple of the identity matrix. In an example embodiment, the sub-matrix $Q_{0,1b,1b}$ is a large multiple of the identity matrix. For example, the sub-matrix $Q_{0,1b,1b}$ may be the identity matrix multiplied by the scalar M, wherein M is two to three orders of magnitude greater than the actual expected drive error, the error introduced by the location sensor of the probe apparatus 20, and/or the like. For example, $\mu_0$ can be provided in the form $\tilde{\mu} = (\mu_0) + (\mu_{1b}) = (\mu_{1a}, \mu_2, \mu_{1b})$, wherein $\mu_0 = (\mu_{1a}, \mu_2, 0)$, $\mu_{1a}$ is a set of node positions and node headings $$\begin{bmatrix} \overrightarrow{pos_{1a}} \\ \overrightarrow{head_{1a}} \end{bmatrix}$$

of the group 1a nodes, $\mu_2$ is a set of node positions and node headings $$\begin{bmatrix} \overrightarrow{pos_2} \\ \overrightarrow{head_2} \end{bmatrix}$$

of the group 2 nodes, and $\mu_{1b}$ is a set of node positions and node headings $$\begin{bmatrix} \overrightarrow{pos_{1b}} \\ \overrightarrow{head_{1b}} \end{bmatrix}$$

of the group 1b nodes.

To determine a posterior and/or updated LNG model $L = N(\mu', Q_1)$, a sub-setting operator H is defined, wherein $H(n_{1a}, n_{1b}, n_2) = (n_{1a}, n_{1b})$, $n_{1a}$ are instances of location information/data that are map-matched to an existing node of the LNG model, $n_{1b}$ are instances of location information/data that are not map-matched to an existing node of the LNG model and are the basis of a new node of the LNG model, and $n_2$ are instances of location information/data that are neither map-matched to an existing node nor map-matched to an existing node. As should be understood, $n_2$ is an empty set. The log of the posterior and/or updated LNG model has the form: $\log(L) = K - (\tilde{\mu} - \mu_0)^t Q_0^{-1} (\tilde{\mu} - \mu_0) - (H(\tilde{\mu}) - \vec{n})^t T^{-1} (H(\tilde{\mu}) - \vec{n})$, wherein K is a constant, the superscript t indicates a transpose of the corresponding matrix, and the superscript −1 indicates an inverse of the corresponding matrix. The $K - (\tilde{\mu} - \mu_0)^t Q_0^{-1} (\tilde{\mu} - \mu_0)$ portion is a prior term contributed by the prior, pre-updated LNG model and the $(H(\tilde{\mu}) - \vec{n})^t T^{-1} (H(\tilde{\mu}) - \vec{n})$ portion is a data likelihood term contributed by the update to the LNG model. In an example embodiment, the data likelihood term may be rewritten $$(H(\tilde{\mu}) - \vec{n})^t \Gamma^{-1}(H(\tilde{\mu}) - \vec{n}) = (\tilde{\mu} - (\vec{n}, 0))^t H^t \Gamma^{-1} H(\tilde{\mu} - (\vec{n}, 0)), \text{ where}$$

$$H^t \Gamma^{-1} H = \begin{bmatrix} (\Gamma^{-1})_{1a,1a} & (\Gamma^{-1})_{1a,1b} & 0 \\ (\Gamma^{-1})_{1b,1a} & (\Gamma^{-1})_{1b,1b} & 0 \\ 0 & 0 & 0 \end{bmatrix}.$$

Thus, the posterior and/or updated LNG model $L=N(\mu', Q_1)$ is given by $Q_1=(Q_0^{-1}+H^t T^{-1} H)^{-1}$ and $\mu'=Q_1(Q_0^{-1}(\mu_0)+H^t T^{-1} H(\vec{n}))=\mu_0-Q_0 H^t(\Gamma+HQ_0 H^t)^{-1} H\mu_0+Q_1 H^t T^{-1}(\vec{n})$.

As should be understood, the number of nodes in the LNG model may be quite large (e.g., billions or more). However, for an LNG model having a large number of nodes, the majority of the nodes for any update based on a new drive will be group 2 nodes (e.g., existing nodes for which no instance of location information/data of the new drive was matched). Thus, in most cases, the rank of the new drive (e.g., number of instances of location information/data of the new drive) is considerably smaller than the rank of the LNG model as a whole (e.g., the number of nodes in the LNG model). The update to the LNG model may therefore be computed as a low-rank update. Additionally, the update to the node positions and node headings, as shown above, is a simple additive update to the existing node positions and node headings. Thus, despite the number of nodes of the LNG model, the update to the LNG model is computationally tractable, for example, by defining the operator $$V = \Gamma + HQ_0 H^t = \Gamma + (Q_0)_{1,1}, \text{ where}$$

$$(Q_0)_{1,1} = \begin{bmatrix} Q_{0,1a,1a} & 0 \\ 0 & Q_{0,1b,1b} \end{bmatrix},$$

since it is apriori assumed that the group 1b nodes are not correlated to the group 1a nodes, in an example embodiment. Thus, $Q_1=(Q_0^{-1}+H^t T^{-1} H)^{-1}=Q_0-\Delta Q$, where $\Delta Q=Q_0 H^t V^{-1} HQ_0$, which is of the form $$\Delta Q = \begin{bmatrix} (Q_0)_{1,1} V^{-1}(Q_0)_{1,1} & (Q_0)_{1,1} V^{-1}(Q_0)_{1,2} \\ (Q_0)_{2,1} V^{-1}(Q_0)_{1,1} & (Q_0)_{2,1} V^{-1}(Q_0)_{1,2} \end{bmatrix}.$$

Therefore, the LNG model may be updated based on the new drive using a reasonable amount of processing power. In particular, the tractability of these computations may be increased by computing a significant portion of the update within the smaller group 1 space (e.g., the combination of group 1a and group 1b which are existing in the LNG model to which instances of location information/data of the new drive was matched and new nodes generated based on the unmatched instances of location information/data), and then performing a matrix multiplication step to determine the updated LNG model. The updated LNG model may then be stored, for example, in memory 14 of the model apparatus 10.

Continuing with FIG. 3, at block 320, the updated LNG model and/or a portion thereof may be provided. For example, the model apparatus 10 may provide the updated LNG model. For example, the model apparatus 10 may comprise means, such as the processor 12, memory 14, communications interface 16, and/or the like for providing the updated LNG model. In an example embodiment, the updated LNG model and/or a portion thereof may be provided as a layer of a digital map and/or map tile. For example, in an example embodiment, a lane level map and/or a layer thereof may be generated, determined, and/or derived and/or updated based on the updated LNG model. For example, the lane level map and/or lane level map layer may comprise curves, polylines, and/or the like representing travel lanes, center lines of travel lanes, perimeter/boundary lines of travel lanes, and/or the like of the lane network and that are determined based on and/or derived from the updated LNG model. For example, a map tile comprising a portion of the updated LNG model and/or a lane level map or lane level map layer may be provided (e.g., transmitted) and then received by another computing entity 40. In an example embodiment, the computing entity 40 is a probe apparatus 20. The computing entity 40 may receive the map tile comprising the portion of the updated LNG model and/or lane level map or lane level map layer, process the map tile, and then use the map tile, including the portion of the updated LNG model and/or lane level map or map layer determined based on the updated LNG model, to perform one or more navigation functions. In various embodiments, navigation functions may be localization functions (e.g., determining the location of the computing entity 40 and/or another entity within a map), route planning functions (e.g., determining a route from an origin to a destination), route guidance functions (e.g., assisting an autonomous vehicle and/or human operator navigate a route from an origin to a destination), performing one or more autonomous and/or ADAS functions (e.g., lane keeping, lane change assistance, maintaining a lane), and/or the like.

In various embodiments, the LNG model may start as an empty set and a first new drive may be used to begin to populate the LNG model. For example, a first new drive may be used to generate one or more nodes such that at the first update of the LNG model, group 1a and group 2 are both empty sets. Each new drive thereafter may then be used to update and generate additional nodes of the LNG model.

Updating an LNG Model Based on a Localization Layer Update

In various embodiments, an LNG model may be linked to a localization layer. For example, an instance of location information/data of a new drive may include a localization object identifier identifying a localization object for which information/data is stored within the localization layer. Some example localization objects may be lane lines, road signs (e.g., stop signs, street name signs, yield signs, warning signs, etc.), telephone poles, street lamps and/or lamp posts, building facades, and/or other generally static objects in the vicinity of the lane network that may be observed, identified, and/or the like by one or more sensors 29 of a probe apparatus 20. In various embodiments, a node of the LNG model may comprise observation information/data. In an example embodiment, the observation information/data of a node may comprise one or more localization object identifiers corresponding to localization object identifiers included in instances of location information/data that are map matched to the node. In an example embodiment, the observation information/data of the node may further comprise one or more distance measurements between the localization object and the node (e.g., and/or a position of an instance of location information/data that is map matched to the node), a count of the number of times the localization object has been observed from a node (e.g., the number of times an instance of location information/data that includes the corresponding localization object identifier has been map matched to the node), a ratio/fraction/percentage and/or the like of instances of localization information/data that are map matched to the node that include the corresponding localization object identifier, and/or the like. Thus, one or more nodes of the LNG model may each be linked and/or associated with one or more localization objects of a localization layer.

In various embodiments, the localization layer may be updated. For example, the location, position, and/or the like of a localization object may be updated. For example, a model apparatus 10 or another apparatus (e.g., map matching engine 30 or other computing entity 40) may update the location, position, and/or the like of a localization object of the localization layer. For example, the location, position, and/or the like of the localization object may be updated to a more precise, accurate, and/or improved location, position, and/or the like. In an example embodiment, the updating of one or more localization objects of the localization layer may generate and/or cause a localization layer update trigger to be issued, generated, passed to the model apparatus 10, identified and/or observed by the model apparatus 10 (e.g., via processor 12), and/or the like. In an example embodiment, if an update of a localization object is performed because the localization object itself was moved, removed, placed in a new position and/or the like, (e.g., an old stop sign was replaced with a new stop sign in a slightly different position, and/or the like) the moved localization object (e.g., the localization object in the new position) may be provided with a new localization object identifier and such an update may not cause a location layer update trigger to be issued, generated, passed to the model apparatus 10, identified and/or observed by the model apparatus 10 (e.g., via processor 12), and/or the like.

In various embodiments, the distance measurements between the node and the localization object may be more precise, accurate, and/or the like, than the positions of the instances of localization information/data received as parts of new drives and/or, as a result thereof, more precise, accurate, and/or the like, than the node positions of the nodes of the LNG model. Therefore, it may be desired to update the nodes (e.g., node positions, node headings, error measures, connectivity measures, error-connectivity matrix, and/or the like) based on the updates to the localization layer and representative distances between localization objects and various nodes. For example, the observed and/or measured distances between a localization object and a node (e.g., instances of location information/data that have been map matched to the node) may be averaged and/or the like to generate a representative distance between the localization object and the node. FIG. 5 provides a flowchart illustrating example processes, procedures, and operations that are performed in an example embodiment to update an LNG model based on an update to a linked and/or associated localization layer.

Starting at block 502, a localization layer update trigger is identified, observed, received, and/or the like. For example, the model apparatus 10 may identify, observe, receive, and/or the like a localization layer update trigger. For example, the model apparatus 10 may comprise means, such as the processor 12, memory 14, communications interface 16, and/or the like, for identifying, observing, receiving, and/or the like a localization layer update trigger. In an example embodiment, a localization layer update trigger indicates one or more localization objects that have been updated. For example, FIG. 6 shows a portion of an LNG model 600 and a portion of a localization layer 610. The LNG model 600 comprises a plurality of nodes 602. The localization layer 610 comprises a plurality of localization objects 612 (e.g., 612A, 612B). For example, the localization layer 610 may comprise a plurality of localization objects 612A that have not been updated and one or more localization objects 612B that have been updated. For example, an updated localization object 612B may comprise an object position that has been updated, a localization object identifier, and/or the like.

Continuing with FIG. 5, at block 504, the updated localization objects 612B may be identified. For example, the model apparatus 10 may identify the updated localization objects 612B. For example, the model apparatus 10 may comprise means, such as the processor 12, memory 14, and/or the like, for identifying the updated localization objects 612B. For example, the localization layer update trigger may indicate and/or comprise the localization object identifiers of the updated localization objects 612B. In another example, the localization layer may comprise and/or be associated with an update log that may indicate and/or comprise the localization object identifiers of the updated localization objects 612B. In various embodiments, an update to a localization object 612B may be an adjustment of a localization object position x from a prior position $x_0$ to an updated position x' of the form $x'=x_0+\Delta x$.

At block 506, an observing set of nodes K are identified. For example, the model apparatus 10 may identify an observing set of nodes K. For example, the model apparatus 10 may comprise means, such as processor 12, memory 14, and/or the like, for identifying an observing set of nodes K. In an example embodiment, each node of the observing set of nodes K comprises observation information/data comprising a localization object identifier corresponding to an updated localization object 612B. For example, the observing set of nodes K may be identified based on the observing information/data of the nodes and identified updated localization object 612B, and/or the like. In an example embodiment, each node of the observing set of nodes K comprises a count of the number of times the updated localization object 612B was observed from the node, one or more distances d corresponding to measurements between the node and the updated localization object 612B (e.g., between the position of an instance of location information/data and the updated localization object 612B), and/or the like.

At block 508, an excluded set of nodes I is identified. For example, the model apparatus 10 identifies an excluded set of nodes I. For example, the model apparatus 10 may comprise means, such as the processor 12, memory 14, and/or the like, for identifying an excluded set of nodes I. In an example embodiment, the excluded set of nodes are nodes that are too far away (e.g., by distance and/or links between nodes within the LNG model) for the update to the localization layer to affect the node position and/or node heading thereof. In an example embodiment, a node $z_l$ of the LNG model is included in the excluded set I if the maximum value of the elements in the covariance matrices between $z_l$ and each node $z_k$ in the observing set K is less than a small positive value $\delta$. In an example embodiment, the small positive value $\delta$ is less than the smallest eigenvalue of the error-connectivity matrix Q, the covariance matrix C(l,k), and/or the like. For example, the small positive value $\delta$ may be two or more orders of magnitude smaller than the smallest eigenvalue of the error-connectivity matrix Q, the covariance matrix C(l,k), and/or the like. For example, a node $z_l$ is in the excluded set I if, for each node $z_k$ in the observing set K, max|C(l,k)|<$\delta$, where C(l,k)=Covar($z_l$, $z_k$) and Covar is the covariance operator. In various embodiments, the small positive value $\delta$ is predetermined, predefined, or configurable. In another example embodiment, a node $z_l$ is in the excluded set I if the absolute value of the largest element of the sub-matrix or block of the error-connectivity matrix Q is less than the small positive value δ. In various embodiments, the excluded set I does not include any nodes from the observing set K. In an example embodiment, the excluded set I is not the compliment of the observing set K given the set of nodes L in the LNG model. Thus, there exists an update set of nodes J that includes the nodes of the observing set K and that is the compliment of excluded set I given the set of nodes L in the LNG model. For example, the update set of nodes J includes the nodes of the observing set K and one or more nodes that are not in the observing set K, in an example embodiment. In various embodiments, only the nodes of the update set of nodes J and/or the uncertainty measures (e.g., node error measures, node connectivity measures, and/or the like) that correspond to nodes in the update set of nodes J are updated. As should be understood, the update set J comprises nodes $z_j$ for which for at least one node $z_k$ in the observing set K, max|C(j,k)|>δ, where C(j,k)=Covar($z_j$, $z_k$), Covar is the covariance operator, and δ is a small positive number that, in various embodiments, may be predetermined, predefined, and/or configurable.

In various embodiments, the determinations, calculations, computations, and/or the like corresponding to blocks 510, 512, and 514 may be performed only considering the update set of nodes J. For example, for the sake of the determinations, calculations, computations and/or the like corresponding to block 510, 512, and 514, the LNG model may be considered to only comprise the nodes of the update set of nodes J, thereby greatly reducing the memory and processing power needed to perform the update. In particular, in most situations, the excluded set I will contain a much larger number of nodes than the update set J, and therefore, the memory and processing power needed to perform the update is greatly reduced by performing the update based on the update set J rather than the set of nodes L of the full LNG model. Thus, various embodiments provide an improvement to computer technology by reducing the memory and processing power required to update an LNG model based on an update to a linked and/or associated localization layer.

At block 510, the node position and/or node heading updates are determined. For example, the model apparatus 10 may determine the node position and/or node heading updates. For example, the model apparatus 10 may comprise means, such as the processor 12, memory 14, and/or the like for determining the node position and/or node heading updates. In various embodiments, the node position and/or node heading updates are determined only for the nodes in the update set J. In various embodiments, the node position and/or node heading updates are determined by minimizing a function of the global change of the nodes of the update set J. For example, the update matrix ΔZ may be a vector comprising the node position updates and/or node heading updates $\Delta z_l$ of the nodes in the update set J and/or the set of nodes L of the LNG model.

In an example embodiment, ΔZ is found by minimizing the function $f(\Delta Z) = \Sigma_{p\in P} \Sigma_{l \in L} \Sigma_{d_{lp} \in D_{lp}} [\alpha_i (\Delta x_p - \Delta z_l)^2 + \Delta Z^T Q^{-1} \Delta Z]$, wherein the index p indexes the set P of localization objects, $\Delta x_p$ is the update in localization object position and/or heading for localization object p, the index l indexes the set of nodes L of the LNG model, $\Delta z_l$ is the update in the node position and/or node heading for the node 1, Q is the error-connectivity matrix, $d_{lp}$ is a distance measurement and/or observation of localization object p from node 1, and $D_{lp}=\{d_{lp}\}$, the set of measurements and/or observations of localization object p from node 1. In an example embodiment, a node 1 comprises the set $D_{lp}$ for one or more and/or for all p in the set P of localization objects. In an example embodiment, the set P of localization objects is the complete set of localization objects of the localization layer. In an example embodiment, the set P of localization objects is the set of updated localization objects identified at block 504. In another example embodiment, the set P of localization objects is the set of localization objects observed by the nodes of the update set J. As should be understood $\Delta x_p=0$ for all localization objects $x_p$ that were not updated (e.g., the localization objects that were not identified as being updated localization objects at block 504).

For example, the derivative of the function $f(\Delta Z)$ may be taken and set equal to zero to find a minimum of the function. For example, $$\frac{df}{d\Delta Z} = 2\left(\sum_{p\in P}\sum_{d_{lp}\in D_{lp}} [(\Delta x_p - \Delta z_l) + Q^{-1}\Delta Z]\right) = 0$$

may be solved to determine the update matrix ΔZ. For example, an observation matrix D may be defined that is an |L| by |L| matrix and that is defined as a diagonal matrix such that D=diagonal($\Sigma_{p\in P}|D_{lp}|$). Thus, element i, j of the observation matrix D is zero if i≠j and the element i, j of matrix D is equal to the number of observations of all localization objects in the set P that are associated with node i, when i=j. A measurement matrix A may also be defined that is an |L| by |P| matrix, wherein |P| is the number of localization objects in the set P of localization objects. Element 1, p of the measurement matrix A is the number of observations of localization object p associated with node 1. It therefore follows, that ΔZ may be determined by $(Q^{-1}+D)\Delta Z=A\Delta X$, wherein ΔX is the localization object update matrix such that $(\Delta X)_p = \Delta x_p$. Thus, in an example embodiment, $\Delta Z = (Q^{-1}+D)^{-1} A\Delta X$. For nodes i in the excluded set I, $(A\Delta X)_i=0$ and therefore $\Delta z_i=0$, for node i in the excluded set I, as discussed above.

At block 512, the updated node positions and/or node headings are determined. For example, the model apparatus 10 may determine an updated node position and/or node heading for each of one or more nodes of the LNG model. In an example embodiment, the model apparatus 10 may comprise means, such as the processor 12, memory 14, and/or the like, for determining an updated node position and/or node a heading for each of one or more nodes of the LNG model. In an example embodiment, the updated node positions and/or node headings Z' are determined by adding the update matrix ΔZ to a node matrix Z comprising the prior node positions and/or node headings. For example, the updated node positions and/or node headings Z'=Z+ΔZ. In various embodiments, this update is only performed for nodes of the update set J.

At block 514, one or more uncertainty measures may be updated based on the update to the localization layer. For example, the model apparatus 10 may update one or more uncertainty measures based on the update to the localization layer. For example, the model apparatus 10 may comprise means, such as processor 12, memory 14, and/or the like, for updating one or more uncertainty measures based on the update to the localization layer. For example, in an example embodiment, the error-connectivity matrix Q may be updated to generate the updated error connectivity matrix Q'. In an example embodiment, the updated error connectivity matrix $Q'=(Q^{-1}+D)^{-1}$. In various embodiments, $(Q')_{m,n}=(Q)_{m,n}$ for node m and node n both in the excluded set I.

At block 516, the updated LNG model and/or a portion thereof may be provided. For example, the model apparatus 10 may provide the updated LNG model. For example, the model apparatus 10 may comprise means, such as the processor 12, memory 14, communications interface 16, and/or the like for providing the updated LNG model. In an example embodiment, the updated LNG model and/or a portion thereof may be provided as a layer of a digital map and/or map tile. For example, in an example embodiment, a lane level map and/or a layer thereof may be generated and/or updated based on the updated LNG model. For example, the lane level map and/or lane level map layer may comprise curves, polylines, and/or the like representing travel lanes, center lines of travel lanes, perimeter/boundary lines of travel lanes, and/or the like of the lane network and that are determined based on and/or derived from the updated LNG model. For example, a map tile comprising a portion of the updated LNG model and/or a lane level map or lane level map layer may be provided (e.g., transmitted) and then received by another computing entity 40. In an example embodiment, the computing entity 40 is a probe apparatus 20. The computing entity 40 may receive the map tile comprising the portion of the updated LNG model and/or lane level map or lane level map layer, process the map tile, and then use the map tile, including the portion of the updated LNG model and/or lane level map or map layer determined based on the updated LNG model, to perform one or more navigation functions. In various embodiments, navigation functions may be localization functions (e.g., determining the location of the computing entity 40 and/or another entity within a map), route planning functions (e.g., determining a route from an origin to a destination), route guidance functions (e.g., assisting an autonomous vehicle and/or human operator navigate a route from an origin to a destination), controlling ADAS (e.g., with functions such as lane keeping, lane changing assistance, automated overtake maneuvers, merging maneuvers, or autonomous driving, and/or other functions) and/or the like.

Advantages

Various embodiments of the present invention provide methods, apparatuses, systems, computer program products, and/or the like for generating and updating an LNG model. For example, the LNG model may be generated and/or updated based on new drives comprising a time sequence of a plurality of instances of location information/data. The new drives may be provided by probe apparatuses onboard vehicles that are traversing at least portions of the physical lane network represented by the LNG model. Thus, in an example embodiment, the LNG model may be generated and/or updated based on new drives (e.g., vehicle trajectories) provided by general purpose navigation systems (e.g., probe apparatuses). For example, the LNG model may be generated and/or updated based on crowdsourced information/data. In another example, the LNG model may be updated based on updates to a linked and/or associated localization layer of a digital map.

As should be understood, an LNG model may be updated and/or expanded based on new drives such that the LNG model represents the physical lane network of a large geographical region (e.g., a city, a metropolitan area, a county, a portion of a state, a state, a country or region thereof, a continent, and/or the like). Thus, an LNG model may comprise a very large number of nodes. For example, an example LNG model may comprise billions of nodes or more. Thus, the maintenance, storage, and accessing of the LNG model requires the use of computer technology.

Moreover, the LNG model and/or portions thereof may be used to perform one or more lane level navigation functions. In various embodiments, the LNG model may be used by a computing entity (e.g., a navigation system, vehicle control system, and/or the like) to perform one or more lane level navigation functions such as, for example, determining a route from an origin to a destination with lane level details, providing information/data regarding an area of a digital map and/or lane network, providing lane level route guidance for a human operator or an autonomous vehicle, estimating travel time and/or travel distance, performing one or more autonomous and/or ADAS functions (e.g., lane keeping, lane change assistance, maintaining a lane), and/or the like. For example, the LNG model and/or a portion thereof may be provided as a layer of a digital map and/or a map tile of a digital map for use by a computing entity in performing one or more lane level navigation functions. Thus, the LNG model and the update techniques provided herein improve navigation technology by enabling the performance of lane level navigation functions.

Various embodiments of the present invention provide for updating an LNG model. As noted above, an LNG model may comprise a very large number of nodes. Example embodiments of the present invention provide further improvements of navigation technology by providing techniques for updating an LNG model that are computationally tractable. For example, various embodiments of the present invention provide techniques for updating the LNG model while minimizing the memory and processing power needed to perform the update. For example, when updating the LNG model based on a new drive, the majority of the determinations, computations, and/or the like may be completed with the smaller space defined by the group 1a and group 1b nodes. In another example, when updating the LNG model based on a localization layer update, the update may be determined for an update set that comprises significantly fewer nodes than the LNG model as a whole and that only includes nodes for which the update is likely to have a notable effect on the node. Thus, various embodiments provide an improvement to navigation technology by reducing memory and processing power requirements for updating a large LNG model.

III. Example Apparatus

The probe apparatus 20, map matching engine 30, computing entity 40, and/or model apparatus 10 of an example embodiment may be embodied by or associated with a variety of computing devices including, for example, a navigation system including an in-vehicle navigation system, a vehicle control system, a personal navigation device (PND) or a portable navigation device, an advanced driver assistance system (ADAS), a global navigation satellite system (GNSS), a cellular telephone, a mobile phone, a personal digital assistant (PDA), a watch, a camera, a computer, and/or other device that can perform navigation-related functions, such as digital routing and map display. Additionally or alternatively, the map matching engine 30, probe apparatus 20, computing entity 40, and/or model apparatus 10 may be embodied in other types of computing devices, such as a server, a personal computer, a computer workstation, a laptop computer, a plurality of networked computing devices or the like, that are configured to update one or more map tiles, analyze probe points for route planning or other purposes. In an example embodiment, a probe apparatus 20 is an in-vehicle navigation system onboard a vehicle 5 or a mobile device; a model apparatus 10 is a server; and a computing entity 40 is a navigation system and/or device, and/or the like. In this regard, FIG. 2A depicts an example model apparatus 10 and FIG. 2B depicts an example probe apparatus 20 that may be embodied by various computing devices including those identified above. As shown, the model apparatus 10 of an example embodiment may include, may be associated with, or may otherwise be in communication with a processor 12 and a memory device 14 and optionally a communication interface 16 and/or a user interface 18. Similarly, a probe apparatus 20 of an example embodiment may include, may be associated with, or may otherwise be in communication with a processor 22 and a memory device 24 and optionally a communication interface 26, a user interface 28, one or more sensors 29 (e.g., a location sensor such as a GNSS sensor, IMU sensors, and/or the like; camera(s); 2D and/or 3D LiDAR(s); long, medium, and/or short range RADAR; ultrasonic sensors; electromagnetic sensors; (near-)IR cameras, 3D cameras, 360° cameras; and/or other sensors that enable the probe apparatus to determine one or more features of the corresponding vehicle's 5 surroundings), and/or other components configured to perform various operations, procedures, functions, or the like described herein. In example embodiments, a computing entity 30 may, similar to the model apparatus 10 and/or probe apparatus 20, comprise a processor, memory device, communication interface, user interface, and/or one or more additional components configured to perform various operations, procedures, functions, or the like described herein. In an example embodiment, a computing entity 40 may comprise one or more sensors similar to the one or more sensors 29.

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a non-transitory computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the model apparatus 10, probe apparatus 20, map matching engine 30, and/or computing entity 40 may be embodied by a computing device. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 12, 22 may be embodied in a number of different ways. For example, the processor 12, 22 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 12, 22 may include one or more processing cores configured to perform independently. A multi-core processor may enable multiprocessing within a single physical package. Additionally or alternatively, the processor 12, 22 may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executable instructions embedded within a link record of a map tile and/or provided as part of a conflict-resolved travel plan. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the model apparatus 10, computing entity 30, and/or probe apparatus 20 may include a user interface 18, 28 that may, in turn, be in communication with the processor 12, 22 to provide output to the user, such as one or more potential DFC corridors and the corresponding rankings, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor 12, 22 (e.g., memory device 14, 24, and/or the like).

The model apparatus 10, computing entity 30, and/or the probe apparatus 20 may optionally include a communication interface 16, 26. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In addition to embodying the model apparatus 10, map matching engine 30, computing entity 40, and/or probe apparatus 20 of an example embodiment, a navigation system may also include or have access to a geographic database that includes a variety of data (e.g., map information/data, at least a portion of an LNG model) utilized in constructing a route or navigation path, determining the time to traverse the route or navigation path, matching a geolocation (e.g., a GNSS determined location) to a point on a map, a lane of a lane network, and/or link, and/or the like. For example, a geographic database may include an LNG model and/or portion thereof, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GNSS data associations (such as using known or future map matching or geo-coding techniques), for example. In an example embodiment, the data records may comprise nodes, connection information/data, intersection data records, link data records, POI data records, and/or other data records. In an example embodiment, the model apparatus 10 may be configured to modify, update, and/or the like one or more data records of the geographic database. For example, the model apparatus 10 may modify, update, generate, and/or the like an LNG model and/or the corresponding data records, a localization layer and/or the corresponding data records, and/or the like.

In an example embodiment, the connection information/data and/or road segment data records are links or segments, e.g., maneuvers of a maneuver graph, representing roads, streets, or paths, as can be used in the calculated route or recorded route information for determination of one or more personalized routes. The intersection data records are end points corresponding to the respective links or segments of the road segment data records. The road link data records and the intersection data records represent a road network, such as used by vehicles, cars, and/or other entities. Similarly, the nodes and connection information/data of the LNG model represent a lane network, such as used by vehicles, cars, and/or other entities. Alternatively, the geographic database can contain path segment and intersection data records or nodes and connection information/data or other data that represent pedestrian paths or areas in addition to or instead of the vehicle road record data, for example.

The road/link segments, intersections, and/or nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In an example embodiment, the geographic database (e.g., the LNG model) may be generated and/or updated based on information/data provided by a plurality of non-dedicated probe apparatuses. For example, the probe apparatuses may be onboard vehicles owned and/or operated by and/or on behalf of members of the general public such that, for example, new drives used to generate and/or update the LNG model may be crowdsourced.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a model apparatus 10, computing entity 40, and/or probe apparatus 20 in accordance with an example embodiment may determine the time to traverse a route that includes one or more turns at respective intersections more accurately.

IV. Apparatus, Methods, and Computer Program Products

As described above, FIGS. 3 and 5 illustrate flowcharts of a model apparatus 10, methods, and computer program products according to an example embodiment of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14, 24 of an apparatus employing an embodiment of the present invention and executed by the processor 12, 22 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:

receiving a new drive by a model apparatus comprising a processor, memory storing computer program code, and a communication interface configured to communicate via at least one network, the new drive comprising a plurality of instances of location data, each instance of location data (a) captured by a probe apparatus onboard a vehicle traversing at least a portion of a traversable lane network and (b) comprising a position and a heading corresponding to the vehicle when the instance of location data was captured, the probe apparatus comprising at least one location sensor;

map matching the plurality of instances of location data based on a lane network graph (LNG) model by executing at least a portion of the computer program code by the processor, the LNG model comprising (a) a plurality of nodes corresponding to locations of traversable lanes of the lane network and (b) one or more uncertainty measures corresponding to the plurality of nodes, wherein a first node of the plurality of nodes comprises (i) a node position and (ii) a node heading;

identifying one or more matched nodes from the plurality of nodes by executing at least a portion of the computer program code by the processor, each matched node having one or more instances of location data map matched thereto, wherein a first node is identified as matching a first instance of location data based on (a) at least one of (i) the position or (ii) the heading of an instance of location data and (b) at least one of (i) a first node position or (ii) a first node heading of the first node;

determining at least one of a position update, a heading update, or an uncertainty measure update based on the plurality of instances of location data by executing at least a portion of the computer program code by the processor; and updating at least one of the node position, node heading, or uncertainty measure based on the corresponding at least one of the position update, the heading update, or the uncertainty measure update to generate an updated LNG model by executing at least a portion of the computer program code by the processor.

2. The method of claim 1, further comprising:

preparing a map tile comprising a lane level map layer derived based on at least a portion of the updated LNG model by executing at least a portion of the computer program code by the processor; and providing the map tile to a computing entity via the communication interface, wherein the computing entity is configured to perform one or more navigation functions based on the updated map tile.

3. The method of claim 2, wherein the computing entity is an advanced driving assistance system and the one or more navigation functions are used in the autonomous or assisted driving of a vehicle corresponding to the computing entity.

4. The method of claim 1, wherein the uncertainty measure encodes at least one of (a) uncertainty in the first node position or (b) uncertainty in the first node heading.

5. The method of claim 1, wherein the uncertainty measure encodes at least one of (a) uncertainty in the first node position due to uncertainty in a second node position or a second node heading of a second node or (b) uncertainty in the first node heading due to uncertainty in the second node position or the second node heading of the second node, wherein the second node is different from the first node.

6. The method of claim 1, further comprising:
fitting a curve to the plurality of instances of location data; and
generating a plurality of interpolated instances of location data based on the curve,
wherein map matching the plurality of instances of location data comprises map matching the plurality of interpolated instances of location data.

7. The method of claim 1, wherein the first node further comprises one or more instances of observation data, each instance of observation data identifying a localization object of a localization layer.

8. The method of claim 7, further comprising:
identifying a localization layer update trigger;
responsive to identifying the localization update trigger, identifying one or more localization objects that have been updated;
identifying a set of observing nodes, the set of observing nodes consisting of nodes comprising observation data identifying at least one of the one or more localization objects that have been updated;
determining at least one of a localization layer position update, a localization layer heading update, or a localization layer uncertainty measure update for each node of a set of update nodes based on the one or more localization objects that have been updated, wherein the set of update nodes comprises the set of observing nodes and one or more nodes not in the set of observing nodes; and
determining at least one of an updated node position, updated node heading, or updated uncertainty measure based on the corresponding at least one of the localization layer position update, localization layer heading update, or localization layer uncertainty measure update for each node of the set of update nodes.

9. The method of claim 8, wherein determining the at least one of the localization layer position update, the localization layer heading update, or the localization layer uncertainty measure update is a low-rank matrix operation.

10. The method of claim 8, wherein a plurality of nodes of the LNG model are not in the set of update nodes and the plurality of nodes of the LNG model that are not in the set of update nodes are not updated.

11. The method of claim 1, wherein one or more instances of location data of the plurality of instances of location data are unmatched as a result of the map matching and the method further comprises generating one or more new nodes based on the unmatched instances of location data.

12. An apparatus comprising at least one processor, a communications interface configured for communicating via at least one network, and at least one memory storing computer program code, the at least one memory and the computer program code configured to, with the processor, cause the apparatus to at least:
receive a new drive, the new drive comprising a plurality of instances of location data, each instance of location data (a) captured by a probe apparatus onboard a vehicle traversing at least a portion of a traversable lane network and (b) comprising a position and a heading corresponding to the vehicle when the instance of location data was captured, the probe apparatus comprising at least one location sensor;
map match the plurality of instances of location data based on a lane network graph (LNG) model, the LNG model comprising (a) a plurality of nodes corresponding to locations of traversable lanes of the lane network and (b) one or more uncertainty measures corresponding to the plurality of nodes, wherein a first node of the plurality of nodes comprises (i) a node position and (ii) a node heading;
identify one or more matched nodes from the plurality of nodes, each matched node having one or more instances of location data map matched thereto, wherein a first node is identified as matching a first instance of location data based on (a) at least one of (i) the position or (ii) the heading of an instance of location data and (b) at least one of (i) a first node position or (ii) a first node heading of the first node;
determine at least one of a position update, a heading update, or an uncertainty measure update based on the plurality of instances of location data; and
update at least one of the node position, node heading, or uncertainty measure based on the corresponding at least one of the position update, the heading update, or the uncertainty measure update to generate an updated LNG model.

13. The apparatus of claim 12, wherein the at least one memory and the computer program code are further configured to, with the processor, cause the apparatus to at least:
prepare a map tile comprising a lane level map layer derived based on at least a portion of the updated LNG model by executing at least a portion of the computer program code by the processor; and
provide the map tile to a computing entity via the communication interface, wherein the computing entity is configured to perform one or more navigation functions based on the updated map tile.

14. The apparatus of claim 12, wherein the at least one memory and the computer program code are further configured to, with the processor, cause the apparatus to at least when one or more instances of location data of the plurality of instances of location data are unmatched as a result of the map matching, generate one or more new nodes based on the unmatched instances of location data.

15. The apparatus of claim 12, wherein the uncertainty measure encodes at least one of (a) uncertainty in the first node position due to uncertainty in a second node position or a second node heading of a second node or (b) uncertainty in the first node heading due to uncertainty in the second node position or the second node heading of the second node, wherein the second node is different from the first node.

16. The apparatus of claim 12, wherein the at least one memory and the computer program code are further configured to, with the processor, cause the apparatus to at least:
fit a curve to the plurality of instances of location data; and generate a plurality of interpolated instances of location data based on the curve,
wherein the plurality of instances of location data that are map matched are the plurality of interpolated instances of location data.

17. The apparatus of claim 12, wherein the first node further comprises one or more instances of observation data, each instance of observation data identifying a localization object of a localization layer.

18. The apparatus of claim 17, wherein the at least one memory and the computer program code are further configured to, with the processor, cause the apparatus to at least:
identify a localization layer update trigger;
responsive to identifying the localization update trigger, identify one or more localization objects that have been updated;
identify a set of observing nodes, the set of observing nodes consisting of nodes comprising observation data identifying at least one of the one or more localization objects that have been updated;
determine at least one of a localization layer position update, a localization layer heading update, or a localization layer uncertainty measure update for each node of a set of update nodes based on the one or more localization objects that have been updated, wherein the set of update nodes comprises the set of observing nodes and one or more nodes not in the set of observing nodes; and
determine at least one of an updated node position, updated node heading, or updated uncertainty measure based on the corresponding at least one of the localization layer position update, localization layer heading update, or localization layer uncertainty measure update for each node of the set of update nodes.

19. The apparatus of claim 18, wherein determining the at least one of the localization layer position update, the localization layer heading update, or the localization layer uncertainty measure update is a low-rank matrix operation.

20. A computer program product comprising at least one non-transitory computer-readable storage medium having computer-readable program code portions stored therein, the computer-readable program code portions comprising executable portions configured, when executed by a processor of a model apparatus, to cause the model apparatus to:
receive a new drive, the new drive comprising a plurality of instances of location data, each instance of location data (a) captured by a probe apparatus onboard a vehicle traversing at least a portion of a traversable lane network and (b) comprising a position and a heading corresponding to the vehicle when the instance of location data was captured, the probe apparatus comprising at least one location sensor;
map match the plurality of instances of location data based on a lane network graph (LNG) model, the LNG model comprising (a) a plurality of nodes corresponding to locations of traversable lanes of the lane network and (b) one or more uncertainty measures corresponding to the plurality of nodes, wherein a first node of the plurality of nodes comprises (i) a node position and (ii) a node heading;
identify one or more matched nodes from the plurality of nodes, each matched node having one or more instances of location data map matched thereto, wherein a first node is identified as matching a first instance of location data based on (a) at least one of (i) the position or (ii) the heading of an instance of location data and (b) at least one of (i) a first node position or (ii) a first node heading of the first node;
determine at least one of a position update, a heading update, or an uncertainty measure update based on the plurality of instances of location data; and
update at least one of the node position, node heading, or uncertainty measure based on the corresponding at least one of the position update, the heading update, or the uncertainty measure update to generate an updated LNG model.

21. The computer program product of claim 20, wherein the executable portions are further configured, when executed by a processor of a model apparatus, to cause the model apparatus to:
prepare a map tile comprising a lane level map layer derived based on at least a portion of the updated LNG model; and
provide the map tile to a computing entity via a communication interface of the model apparatus, wherein the computing entity is configured to perform one or more navigation functions based on the updated map tile.

22. The computer program product of claim 20, wherein the executable portions are further configured, when executed by a processor of a model apparatus, to cause the model apparatus to, when one or more instances of location data of the plurality of instances of location data are unmatched as a result of the map matching, generate one or more new nodes based on the unmatched instances of location data.

23. The computer program product of claim 20, wherein the executable portions are further configured, when executed by a processor of a model apparatus, to cause the model apparatus to:
fit a curve to the plurality of instances of location data; and
generate a plurality of interpolated instances of location data based on the curve,
wherein the plurality of instances of location data that are map matched are the plurality of interpolated instances of location data.

24. The computer program product of claim 20, wherein the first node further comprises one or more instances of observation data, each instance of observation data identifying a localization object of a localization layer.

25. The computer program product of claim 24, wherein the at least one memory and the computer program code are further configured to, with the processor, cause the apparatus to at least:
identify a localization layer update trigger;
responsive to identifying the localization update trigger, identify one or more localization objects that have been updated;
identify a set of observing nodes, the set of observing nodes consisting of nodes comprising observation data identifying at least one of the one or more localization objects that have been updated;
determine at least one of a localization layer position update, a localization layer heading update, or a localization layer uncertainty measure update for each node of a set of update nodes based on the one or more localization objects that have been updated, wherein the set of update nodes comprises the set of observing nodes and one or more nodes not in the set of observing nodes; and
determine at least one of an updated node position, updated node heading, or updated uncertainty measure based on the corresponding at least one of the localization layer position update, localization layer heading update, or localization layer uncertainty measure update for each node of the set of update nodes.

26. The computer program product of claim 25, wherein determining the at least one of the localization layer position update, the localization layer heading update, or the localization layer uncertainty measure update is a low-rank matrix operation.

* * * * *